(12) United States Patent
Hasegawa et al.

(10) Patent No.: US 8,060,268 B2
(45) Date of Patent: Nov. 15, 2011

(54) CONTROL APPARATUS OF A HYBRID VEHICLE AND METHOD FOR CONTROLLING THE SAME

(75) Inventors: Masami Hasegawa, Yokohama (JP);
Haruhisa Tsuchikawa, Yokohama (JP);
Susumu Yoshida, Mitaka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 588 days.

(21) Appl. No.: 12/323,742

(22) Filed: Nov. 26, 2008

(65) Prior Publication Data

US 2009/0143950 A1    Jun. 4, 2009

(30) Foreign Application Priority Data

Nov. 29, 2007   (JP) .................................. 2007-308139

(51) Int. Cl.
*G05D 3/00*   (2006.01)

(52) U.S. Cl. .......................................... 701/22

(58) Field of Classification Search .................... 701/22, 701/67, 68, 82, 90; 180/65.21, 65.22, 65.25, 180/65.265, 65.275, 65.6, 65.7; 477/5, 6
See application file for complete search history.

(56) References Cited

U.S. PATENT DOCUMENTS

| | | | | |
|---|---|---|---|---|
| 5,841,201 | A | * | 11/1998 | Tabata et al. ............... 290/40 C |
| 5,856,709 | A | * | 1/1999 | Ibaraki et al. .................. 290/45 |
| 2005/0209044 | A1 | * | 9/2005 | Imazu et al. ..................... 477/15 |
| 2007/0272456 | A1 | | 11/2007 | Shiiba |
| 2007/0275819 | A1 | | 11/2007 | Hirata |

FOREIGN PATENT DOCUMENTS

| | | |
|---|---|---|
| EP | 1717084 A2 | 11/2006 |
| EP | 1795423 A1 | 6/2007 |
| EP | 1826088 A2 | 8/2007 |
| JP | 2001-263383 | 9/2001 |

* cited by examiner

*Primary Examiner* — Kim T Nguyen
(74) *Attorney, Agent, or Firm* — Young Basile

(57) ABSTRACT

A control apparatus for a hybrid vehicle that is capable of suppressing overheating of the second clutch is taught herein. Control is switched between engine-used slip drive control and motor drive control on a basis of a vehicle load such as weight or a road incline gradient. Control methods for hybrid vehicles are also disclosed.

20 Claims, 13 Drawing Sheets

CONTROL APPARATUS OF A HYBRID VEHICLE AND METHOD FOR CONTROLLING THE SAME

CROSS-REFERENCE TO RELATED APPLICATION

This application claims priority from Japanese Patent Application Serial No. 2007-308139, filed Nov. 29, 2007, which is incorporated herein in its entirety by reference.

TECHNICAL FIELD

The present invention relates to a control apparatus of a hybrid vehicle having an engine and a motor as a power source and methods for controlling such a hybrid vehicle.

BACKGROUND

Hybrid vehicle technology has been disclosed in Japanese Patent Provisional Publication No. 2001-263383 (hereinafter is referred to as "JP2001-263383"). In JP2001-263383, a hybrid vehicle is disclosed having a first clutch that connects and disconnects an engine and a motor, a second clutch that connects and disconnects the motor and drive road wheels, and a transmission. This hybrid vehicle employs a motor drive mode in which the first clutch is released and the vehicle travels by using only the motor as a power source. Also employed is an engine-used drive mode in which the first clutch is engaged and the vehicle travels while including the engine as the power source. When changing the mode from the motor drive mode to the engine-used drive mode, the first clutch is engaged, and a motor torque is increased and applied to the engine to start the engine. Thus, while in the motor drive mode, a margin for the motor torque is required to be secured to accommodate the increase in the motor torque for starting the engine. Here, when a vehicle travels at an extremely low speed, such as a low engine rotational speed (rpm) that is less than a minimum engine rpm required to allow self-rotation of the engine even when selecting a lowest transmission ratio (for instance, a low or first speed) including at an engine start, the self-rotation of the engine is allowed by slipping the second clutch. That is, by slipping the second clutch, while the drive road wheels are being rotated by the motor at an extremely low revolution speed, the engine is rotated at a rpm which allows the self-rotation of the engine.

BRIEF SUMMARY

Embodiments of a control apparatus for a hybrid-vehicle and methods are taught herein. One embodiment of a control apparatus for a hybrid vehicle comprises an engine, a motor configured to output a driving force of the vehicle, a first clutch installed between the engine and the motor, the first clutch configured to connect and disconnect the engine and the motor, a second clutch installed between the motor and drive wheels, the second clutch configured to connect and disconnect the motor and the drive wheels, a vehicle load detector configured to determine a vehicle load and a controller configured to control the first clutch, the second clutch, the engine, and the motor. When the vehicle load determined by the vehicle load detector is greater than or equal to a predetermined load value, the controller is configured to select a motor slip drive mode in which the first clutch is disengaged, the second clutch is slip-engaged, the engine is operating at a predetermined first revolution speed, and the motor is operating at a second revolution speed which is lower than the predetermined first revolution speed.

Another embodiment of a control apparatus for a hybrid vehicle comprises a controller having an engine, a motor, a first clutch installed between the engine and the motor, and a second clutch installed between the motor and drive wheels. The controller comprises means for determining a vehicle load, means for controlling the engine, means for controlling the motor and means for selecting a drive mode. A motor slip drive mode is selected in which the first clutch is disengaged, the second clutch is slip-engaged, the means for controlling the engine operates the engine at a predetermined first revolution speed, and the means for controlling the motor operates the motor at a second revolution speed which is lower than the predetermined first revolution speed when the vehicle load is greater than or equal to a predetermined load value. An engine-used slip drive mode is selected in which the first clutch is engaged, the second clutch is slip-engaged, and the engine is operating when the vehicle load is less than the predetermined load value.

An embodiment of a control method for a hybrid vehicle including a motor, an engine, a first clutch installed between the engine and the motor, and a second clutch installed between the motor and drive wheels comprises determining a vehicle load and selecting a drive mode. A motor slip drive mode is selected when the vehicle load is less than a predetermined load value. The motor slip drive mode comprises disengaging the first clutch, slip-engaging the second clutch, operating the engine at a predetermined first revolution speed and operating the motor at a second revolution speed which is lower than the predetermined first revolution speed. An engine-used slip drive mode is selected when the vehicle load is less than the predetermined load value. The engine-used slip drive mode comprises engaging the first clutch, slip-engaging the second clutch and operating the engine.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the above hybrid vehicle described in JP2001-263383, the drive mode can be maintained or continued under a condition where a vehicle load is great under circumstances such as having a large gross vehicle weight or traveling on an incline. Since the vehicle will accelerate at a lower rate, the vehicle will remain in an extremely low speed drive range for an extended period of time. Because of this, there is a risk that the second clutch will overheat due to the friction caused during slipping of the second clutch. In contrast, embodiment of the invention provide a control apparatus and method of a hybrid vehicle capable of suppressing the overheating of the second clutch when the vehicle load is great.

Hereinafter, certain embodiments of the control apparatus of the hybrid vehicle of the invention are explained in detail with reference to the drawings.

Figure 1:
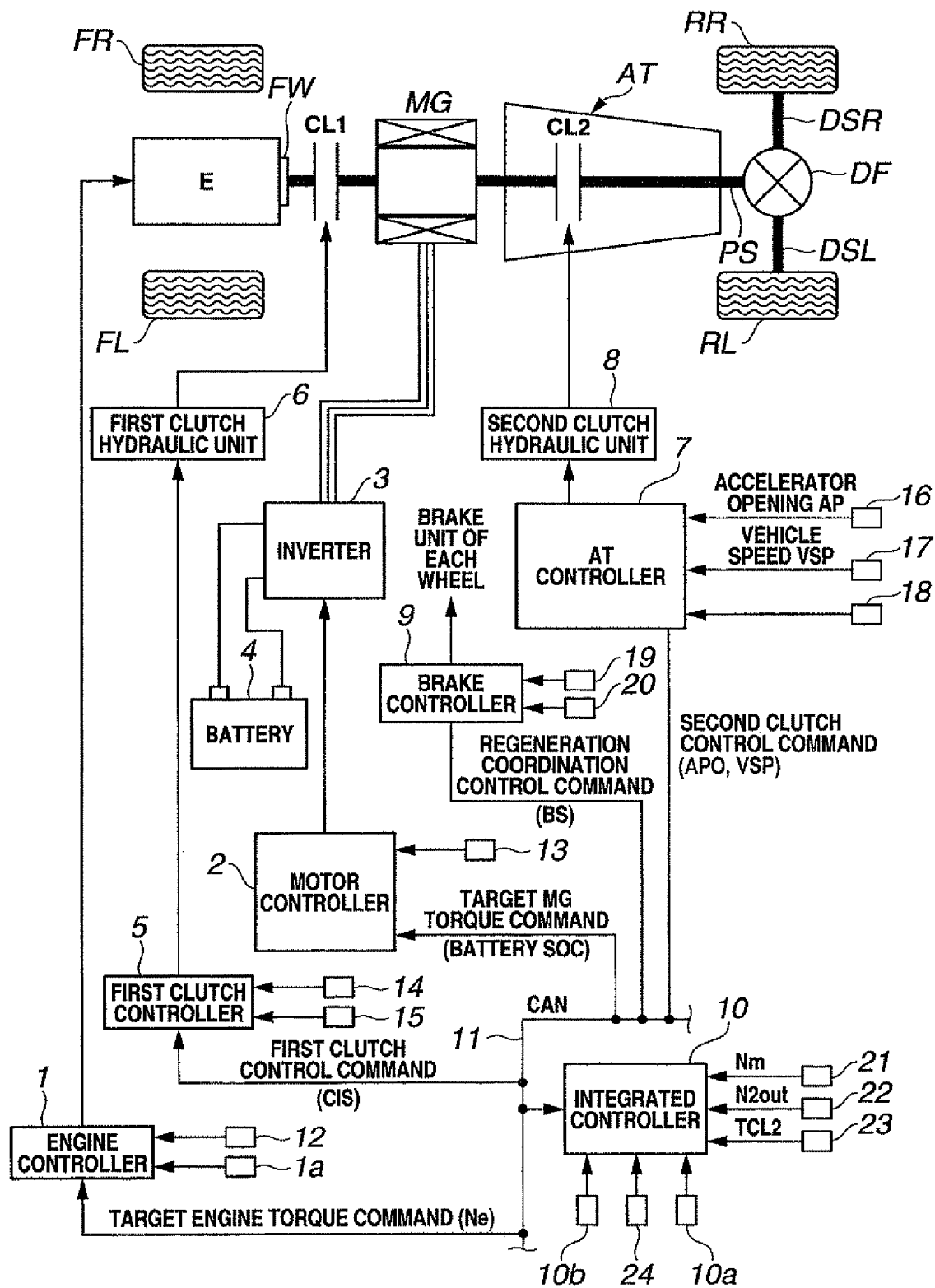
FIG. 1 is a block diagram of a hybrid system showing a rear-drive hybrid vehicle of a first embodiment.

First, a drive system of a hybrid vehicle will be explained. In FIG. 1, a system diagram showing a rear-wheel drive hybrid vehicle employing an engine start control system of the first embodiment is illustrated. The drive system of the hybrid vehicle in the first embodiment has, as shown in FIG. 1, an engine E, a first clutch CL1, a motor-generator MG, a second clutch CL2, an automatic transmission AT, a propeller shaft PS, a differential gear DF, a left drive shaft DSL, a right drive shaft DSR, a rear-left wheel RL (drive wheel), and a rear-right wheel RR (drive wheel). It should also be noted that FL is a front-left wheel, and FR is a front-right wheel.

The engine E is, for instance, a gasoline engine, and includes a throttle valve whose valve opening angle is controlled on the basis of a control command from an engine controller 1. Here, a flywheel FW is installed on an output shaft of engine E.

The first clutch CL1 is a clutch installed between the engine E and the motor-generator MG whose engagement and disengagement, including a slip-engagement, are controlled by a control pressure produced by a first clutch hydraulic unit 6 on the basis of a control command from a first clutch controller 5.

The motor-generator MG is a synchronous type motor-generator in which permanent magnets are embedded into a rotor and stator coils are wound around a stator. The motor-generator MG is controlled by a three-phase alternating current generated by an inverter 3 and applied based on a control command from a motor controller 2. This motor-generator MG can be operated as an electric motor, which revolves by receiving a supply of electrical power from a battery 4 (hereinafter, this state is called a power running state). In a case where the rotor is rotated by an external force, the motor-generator MG can also be operated as a generator that generates an electromotive force at both ends of the stator coil to enable charging of the battery 4 (hereinafter, this operating state is called a regenerative state). Here, the rotor of this motor-generator MG is connected to an input shaft of the automatic transmission AT through a damper (not shown).

The second clutch CL2 is a clutch that is installed between the motor-generator MG and the rear-left and rear-right wheels RL, RR, whose engagement and disengagement, including a slip-engagement, are controlled by a control pressure produced by a second clutch hydraulic unit 8 based on a control command from an AT controller 7.

The automatic transmission AT is a stepped automatic transmission in which a gear ratio of limited stages, such as five forward speeds and one reverse speed, can automatically be shifted according to vehicle operating conditions, such as a vehicle speed and an accelerator opening angle. The second clutch CL2 is not necessarily a clutch that is further added as a special clutch. Instead, some clutch elements from a plurality of clutches that are selectively engaged at each respective gear shift stage of the automatic transmission AT may comprise the second clutch CL2.

An output shaft of the automatic transmission AT is connected to the rear-left and rear-right wheels RL, RR through the propeller shaft PS, the differential gear DF, the left drive shaft DSL and the right drive shaft DSR. With regard to the first and second clutches CL1 and CL2, a wet multiple disc clutch, whose hydraulic flow amount and hydraulic pressure can be continuously controlled by a proportional solenoid, is used for each.

This hybrid drive system has three basic drive modes according to a state of the engagement and disengagement of the first clutch CL1. A first drive mode is an electric vehicle drive mode (hereinafter called an EV drive mode) in which the first clutch CL1 is in a disengaged state and the vehicle travels by only the power of the motor-generator MG as the power source. A second drive mode is a hybrid drive mode (hereinafter called an HEV drive mode) in which the first clutch CL1 is in an engaged state and the vehicle travels while at least the engine E is the power source. Here, when changing the mode from the EV drive mode to the HEV drive mode, the first clutch CL1 is in the engaged state, and the engine start is carried out by applying the torque of the motor-generator MG to the engine E. A third drive mode is an engine-used slip drive mode (Wet Start Clutch drive mode, hereinafter called a WSC drive mode) in which the first clutch CL1 is in the engaged state and the second clutch CL2 is subjected to a slip control, and the vehicle travels while at least the engine E is the power source. While in the WSC drive mode, the vehicle is capable of achieving a creep drive, especially when a state of charge (SOC) of the battery 4 is low or when an engine water temperature is low.

When a driver controls an accelerator pedal to maintain a vehicle stopped state while on an incline with a gradient greater than or equal to a predetermined value (accelerator hill hold), the slip amount of the second clutch CL2 may be too large and will continue in this state in the WSC drive mode. The slip amount of the second clutch CL2 is too large in this case because the revolution speed of the engine E (revolutions per minute, or engine rpm) cannot be set to be lower than an engine idling speed. Accordingly, in the first embodiment, the vehicle further employs a fourth drive mode, which is a motor slip drive mode (Motor Wet Start Clutch drive mode, hereinafter called an MWSC drive mode) in which the first clutch CL1 is disengaged while engine E is operated, and the slip control of the second clutch CL2 is performed while the motor-generator MG is operating, so the vehicle travels with the motor-generator MG being the only power source even though the engine continues operating.

The above-described HEV drive mode includes three drive modes: an engine drive mode, a motor-assisted drive mode, and a running electric power generation mode (hereinafter called a drive generation mode).

In the engine drive mode, the drive wheels are driven with only the engine E as the power source. In the motor-assisted drive mode, the drive wheels are driven with both of the engine E and the motor-generator MG as power sources. In the drive generation mode, while the drive wheels RL, RR are being driven with the engine E as the power source, the motor-generator MG works as a generator to charge the battery 4.

One example of the drive generation mode is during a constant speed (cruise) drive or during an acceleration drive, the motor-generator MG works as the generator by utilizing the power from the engine E to charge the battery 4. In addition, during a deceleration drive, a regeneration of a braking energy is carried out to generate an electric power by means of the motor-generator MG, and this regenerated power is used to charge the battery 4.

Another example of the drive generation mode is while the vehicle is in a stopped state. The motor-generator MG is operated, utilizing the power of the engine E to charge the battery 4.

Next, a control system of the hybrid vehicle will be explained. As shown in FIG. 1, the control system of the hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9 and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

Each of the controllers 1, 2, 5, 7, 9 and 10 are implemented in, for example, a conventional engine control unit such as is known in the art. Each is thus a microcomputer including a random access memory (RAM), a read-only memory (ROM) and a central processing unit (CPU), along with various input and output connections. Generally, the control functions described herein and associated with the controllers, including the various sections of the integrated controller 10 are performed by execution by the CPU of one or more software programs stored in ROM. Of course, some or all of the functions can be implemented by hardware components. Further, although multiple controllers are shown, the various functions can be incorporated in more or fewer controllers.

The engine controller 1 receives information of the engine revolution speed (the engine rpm) from an engine rpm sensor 12 and outputs a command that controls an engine operating point (Ne: the engine revolution speed, Te: an engine torque) to a throttle valve actuator (not shown in the drawing), for example, in accordance with a target engine torque command from the integrated controller 10. The information such as the engine revolution speed Ne, etc. is sent to the integrated controller 10 via the CAN communication line 11.

The motor controller 2 receives information from a resolver 13 that detects a rotational position of the rotor of the motor-generator MG and outputs a command that controls a motor operating point (Nm: a motor-generator revolution speed, Tm: a motor-generator torque) of the motor-generator MG to the inverter 3 in accordance with a target motor-generator torque command from the integrated controller 10. Here, the motor controller 2 checks or watches the battery SOC indicating the charge state of the battery 4. The information concerning the battery SOC is used to control the motor-generator MG and is also sent to the integrated controller 10 via the CAN communication line 11.

The first clutch controller 5 receives sensor information from both of a first clutch hydraulic pressure sensor 14 and a first clutch stroke sensor 15 and outputs a command to the first clutch hydraulic unit 6 in accordance with a first clutch control command from the integrated controller 10 to control the engagement and disengagement of the first clutch CL1. Here, information regarding a first clutch stroke CIS is sent to the integrated controller 10 via the CAN communication line 11.

The AT controller 7 receives input corresponding to sensor information from an accelerator opening angle sensor 16, a vehicle speed sensor 17, a second clutch hydraulic pressure sensor 18 and an inhibitor switch (not shown in the drawing) that outputs a signal corresponding to a position of a shift lever that is operated by the driver. The AT controller 7 then outputs a command that controls the engagement and disengagement of the second clutch CL2 to the second clutch hydraulic unit 8 in an AT hydraulic pressure control valve in accordance with a second clutch control command from the integrated controller 10. Here, information regarding an accelerator opening angle APO and a vehicle speed VSP and the information from the inhibitor switch are sent to the integrated controller 10 via the CAN communication line 11.

The brake controller 9 inputs sensor information from a road wheel speed sensor 19 that detects each wheel speed of the four road wheels and a brake stroke sensor 20. The brake controller 9 performs a regenerative coordination brake control on the basis of a regenerative coordination control command BS from the integrated controller 10 when, for instance, a braking force is insufficient to meet a braking force required according to a brake stroke sensor 20 in the case where only a regenerative braking force is supplied upon a brake operation by the brake pedal depression. In this manner, the shortage of the braking force is compensated by a mechanical braking force (a braking force by a friction brake).

The integrated controller 10 manages consumption energy of the whole vehicle in order to allow the vehicle to travel at a maximum efficiency. The integrated controller 10 receives the information from a motor revolution speed sensor 21 that detects the motor revolution speed Nm, a second clutch output revolution speed sensor 22 that detects an output revolution speed N2out of the second clutch CL2, a second clutch torque sensor 23 that detects a transmission torque capacity TCL2 of the second clutch CL2, a brake hydraulic pressure sensor 24, a temperature sensor 10a that detects a temperature of the second clutch CL2 and a G sensor 10b that detects a forward and a reverse acceleration and also receives information obtained via the CAN communication line 11.

Further, the integrated controller 10 performs an operating control of the engine E by the control command to the engine controller 1, an operating control of the motor-generator MG by the control command to the motor controller 2, the engagement and disengagement control of the first clutch CL1 by the control command to the first clutch controller 5, and the engagement and disengagement control of the second clutch CL2 by the control command to the AT controller 7.

A control executed in the integrated controller 10 in the first embodiment is next explained with reference to the control block diagram in FIG. 2. This control is executed for each control period, at a control cycle period, 10 ms for instance, in the integrated controller 10. The integrated controller 10 has a target drive force operating section 100, a mode selecting section 200, a target charge and discharge operating section 300, an operating point commanding section 400, and a speed change or shift control section 500.

Figure 3:
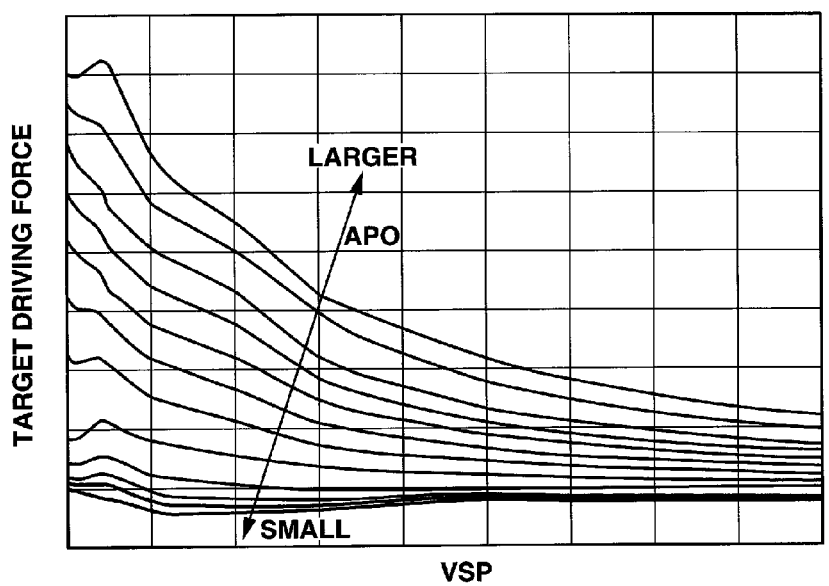
FIG. 3 is an example of a target drive force map used for a target drive force operation in a target drive force operating section in FIG. 2.

The target drive force operating section 100 computes a target drive force tFo0 on the basis of the accelerator opening angle APO and the vehicle speed VSP by using a target drive force map shown in FIG. 3.

The mode selecting section 200 has a road incline gradient estimation operating section 201 that estimates a gradient of a road incline on the basis of the detected value of the G sensor 10b. The road incline gradient estimation operating section 201 computes an actual acceleration on the basis of an average of acceleration of the wheel speed detected by the wheel speed sensor 19 and estimates the road incline gradient on the basis of the deviation between this computation result and the G sensor detection value (a difference between this computation result and the G sensor detection value).

Figure 4:
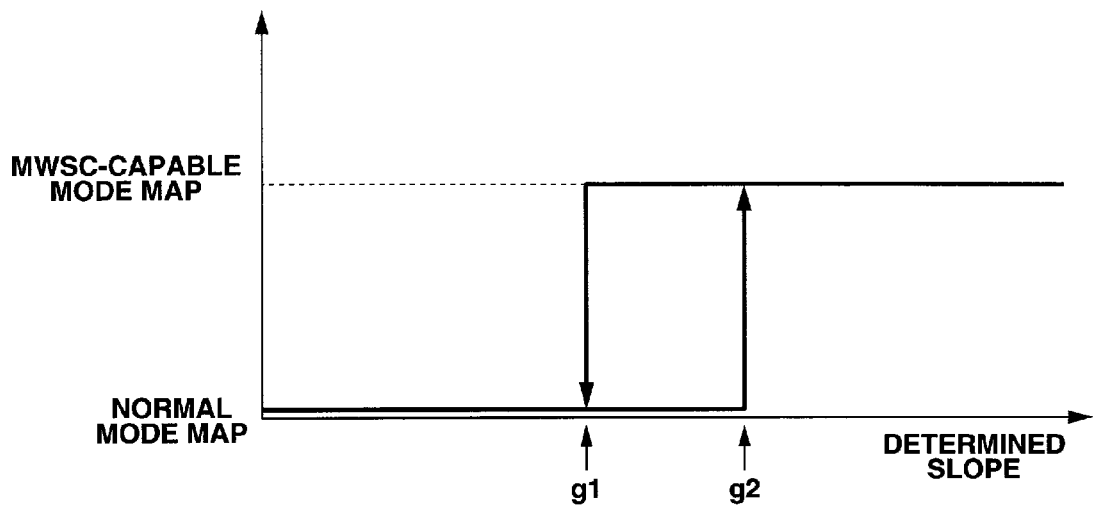
FIG. 4 is a graph showing a relationship between a mode map and an estimated incline gradient in a mode selecting section in FIG. 2.

The mode selecting section 200 further includes a mode map selecting section 202 that selects any one of two mode maps on the basis of the estimated road incline gradient. FIG. 4 is a schematic graph showing selection logic of the mode map selecting section 202. The mode map selecting section 202 switches the map from the normal mode map to an MWSC-capable mode map when the estimated road incline gradient becomes greater than or equal to a predetermined value g2. On the other hand, the mode map selecting section 202 switches from the MWSC-capable mode map to a normal mode map when the estimated road incline gradient becomes less than a predetermined value g1 (<g2). That is to say, a hysteresis is set for the estimated road incline gradient (for the change between both mode maps), thereby preventing a fluctuation during the map change.

Figure 5:
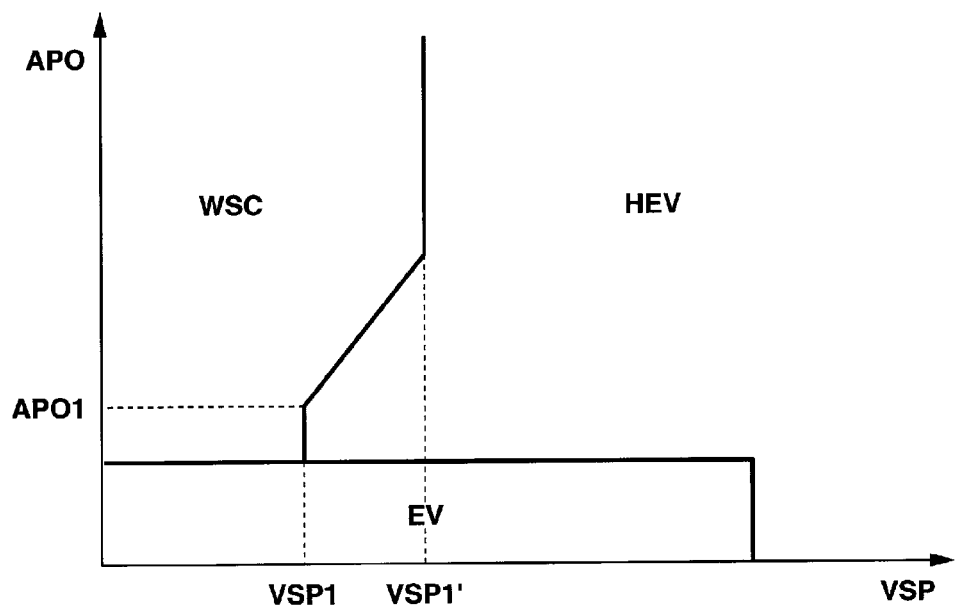
FIG. 5 is a graph showing a normal mode map used for a selection of a target mode in the mode selecting section in FIG. 2.
Figure 6:
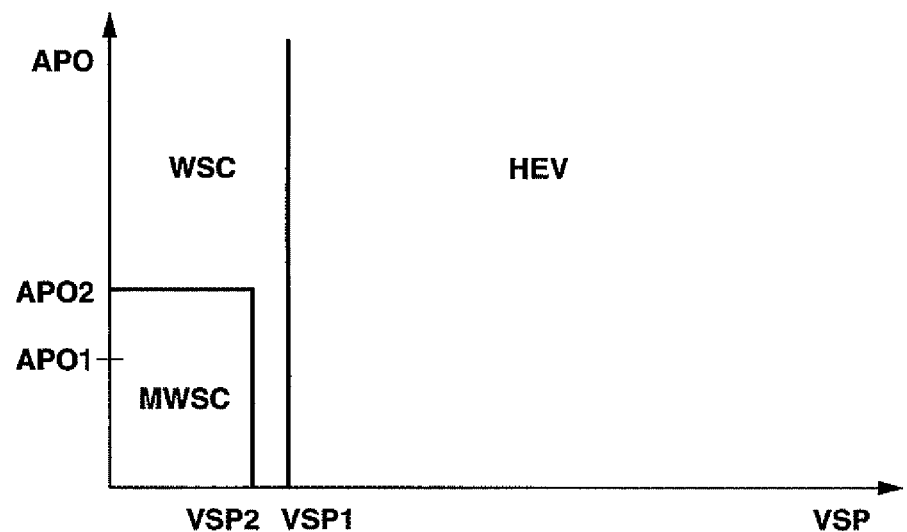
FIG. 6 is a graph showing an MWSC-capable mode map used for a selection of a target mode in the mode selecting section in FIG. 2.

Next, the mode maps are explained. The mode maps include the normal mode map selected when the estimated road incline gradient is less than the predetermined value g1 and the MWSC-capable mode map selected when the estimated road incline gradient is greater than or equal to the predetermined value g2. FIG. 5 illustrates the normal mode map. FIG. 6 illustrates the MWSC-capable mode map.

The normal mode map in FIG. 5 includes the EV drive mode, the WSC drive mode and the HEV drive mode. The target mode is set based on the accelerator opening degree APO and the vehicle speed VSP. It should be noted, however, that even if the EV drive mode is selected, the target mode is forced to select from either the HEV drive mode or the WSC drive mode if the battery SOC is smaller than a predetermined value.

In the normal mode map in FIG. 5, with regard to a switching line between the HEV drive mode and the WSC drive mode, the WSC mode is set to be selected when in an area that is less than a predetermined accelerator opening degree APO1 and less than a predetermined vehicle speed VSP1 that is smaller than the idle speed of the engine E when the automatic transmission AT is the first gear. Further regarding the switching line between the HEV drive mode and the WSC drive mode, the HEV mode is set to be selected when in an area that is greater than or equal to the predetermined accelerator opening degree APO1, since a great drive torque is required, and greater than or equal to a vehicle speed VSP1' that is higher than the lower limit vehicle speed VSP1. In addition, this drive mode change control is configured so that the WSC drive mode is selected when the battery SOC is low, even in a case of the vehicle start, since the EV drive mode cannot be achieved due to low battery charge.

In a case when the accelerator opening degree APO is large, it can be difficult to meet the request of the large accelerator opening degree APO when the drive torque is equal to an engine torque applied by engine E corresponding to the engine idle speed plus the torque applied by the motor-generator MG. Here, as the engine rpm increases, more drive torque can be output. For this reason, even if the WSC drive mode is carried out up to a higher vehicle speed than the lower limit vehicle speed VSP1, by increasing the engine rpm and outputting the greater drive torque, it is possible to change from the WSC drive mode to the HEV drive mode in a short time. This case corresponds to the WSC area that is extended up to the lower limit vehicle speed VSP1' in FIG. 5.

As for the MWSC mode map in FIG. 6, one difference from the normal map is that the EV drive mode is not set in the MWSC mode map. Another difference from the normal map is that the WSC drive mode area is not changed according to the accelerator opening degree APO, but is instead set or defined by only the lower limit vehicle speed VSP1. In addition, the MWSC mode map sets the MWSC drive mode within a portion of the WSC drive mode area. The MWSC drive mode is set in an area defined by a predetermined vehicle speed VSP2 that is lower than the lower limit vehicle speed VSP1 and a predetermined accelerator opening degree APO2 that is higher than the predetermined accelerator opening degree APO1. It should be noted, however, that even if the MWSC mode is selected, the target mode is forcefully set to the WSC drive mode if the battery SOC is less than a predetermined value.

Figure 2:
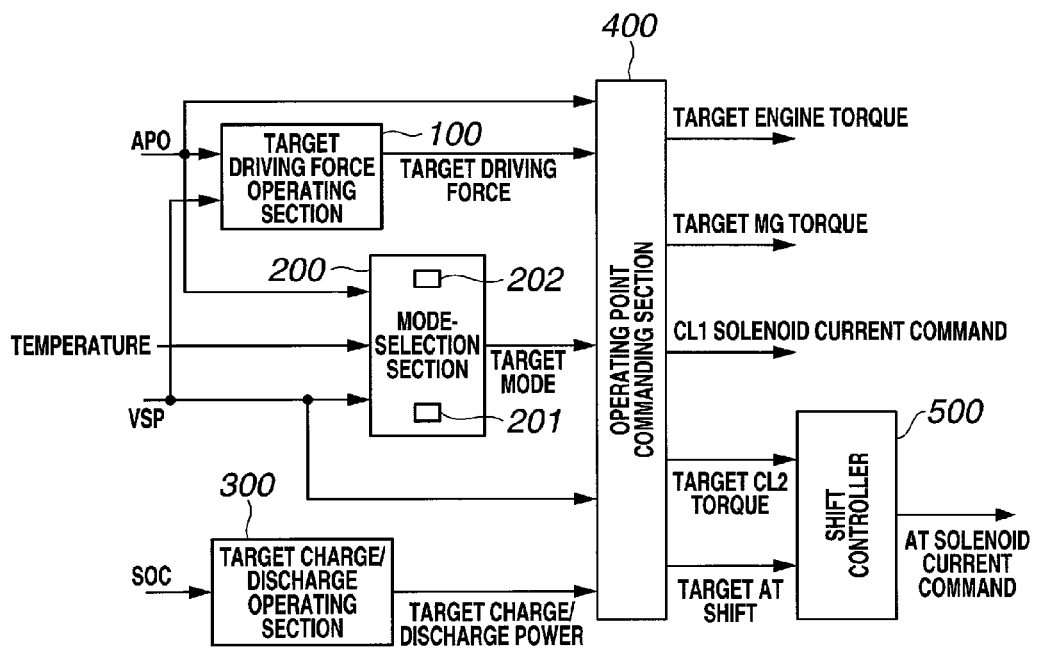
FIG. 2 is a control block diagram showing an operation program in an integrated controller of the first embodiment.
Figure 7:
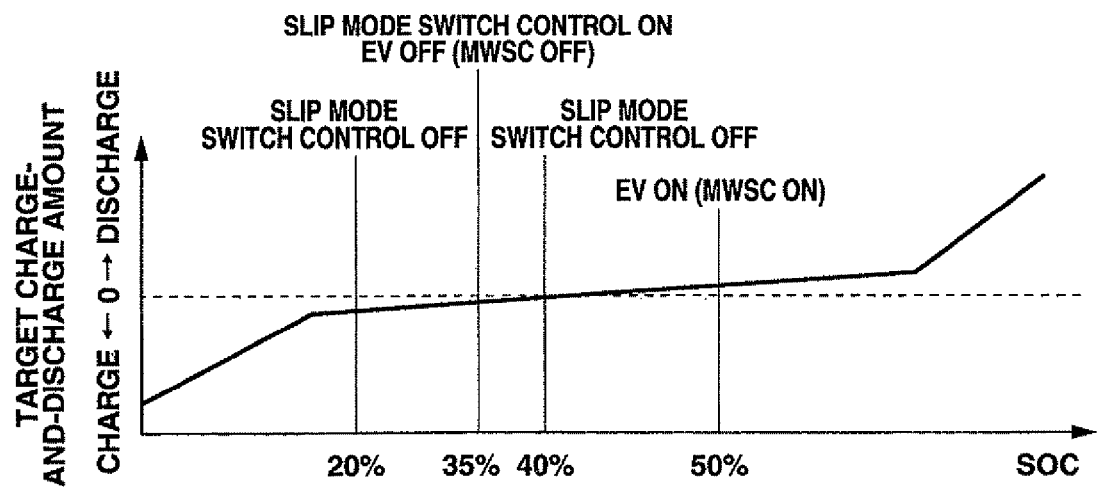
FIG. 7 is a graph showing an example of a target charge/discharge amount map used for an operation of a target charge/discharge power in a target charge/discharge operating section in FIG. 2.

Referring to FIG. 2, the target charge-and-discharge operating section 300 computes a target charge-and-discharge power tP on the basis of the battery SOC by using a target charge-and-discharge amount map shown in FIG. 7. In the target charge-and-discharge amount map, an EV ON line (or an MWSC ON line) to allow or inhibit the EV mode or the MWSC drive mode is set to SOC=50 % and an EV OFF line (or an MWSC OFF line) is set to SOC=35%.

If SOC≧50%, an EV drive mode region appears in the normal mode map of FIG. 5 and, in the MWSC-capable mode map shown in FIG. 6, the MWSC drive mode region appears. Once the EV mode (shown in FIG. 5) or MWSC drive mode region (shown in FIG. 6) appears within the normal mode map or within the MWSC-capable mode map, this drive mode region continues to appear until the SOC is reduced and becomes below 35%.

If SOC<35%, the EV mode region disappears in the normal mode map shown in FIG. 5 and, in the same way as the EV mode region, the MWSC drive mode region disappears in the MWSC-capable mode map shown in FIG. 6. If the EV or MWSC drive mode region disappears from the mode map, they do not reappear until the SOC reaches 50%.

In addition, in the target charge-and-discharge amount map (shown in FIG. 7), a slip mode switch control ON line is set to SOC=35% and the slip mode switch control OFF line is set to SOC=40% and to SOC=20%. It should be noted that the slip mode switch control is an alternate switch control between the EV mode and the WSC drive mode or an alternate switch control between the MWSC drive mode and the WSC drive mode. The details thereof are described later.

If SOC≧35%, the slip mode switch control is requested. If the SOC is reduced and becomes below 35%, the EV mode region (MWSC drive mode region) disappears in principle. However, during the execution of the slip mode switch control, it is necessary to select the EV mode (or MWSC drive mode) according to its necessity. Then, when the slip mode switch control is requested, the selection of the EV mode (or the MWSC drive mode) based on the slip mode switch control is requested even if the SOC is reduced and falls below the EV OFF line and the EV mode region disappears from the corresponding mode map.

If SOC<20%, the slip mode switch control is inhibited. It is necessary to select either the EV mode or the MWSC drive mode properly. However, it is furthermore difficult for the hybrid vehicle to travel by the driving force only through motor-generator MG if the SOC is reduced below 20%. It should be noted that if SOC is reduced below 20%, the mode enters a fail mode, prompting the vehicle driver to perform a brake pedal depression operation (including an illumination of a corresponding lamp, a vocal guidance, a display through a navigation system, and so forth). If the SOC has reached the state that SOC=40% during the execution of a slip mode switch control, the slip mode switch control is terminated. At this time, the EV or MWSC drive mode based on the normal mode map is selected.

Referring back to FIG. 2, the operating point commanding section 400 calculates a transitional target engine torque, target motor-generator torque, target second clutch transmission torque capacity, a target shift stage of the automatic transmission AT and a first clutch solenoid current command on the basis of the accelerator opening degree APO, the target drive torque tFo0, the target mode, the vehicle speed VSP and the target charge-and-discharge power tP, as attainment targets of these operating points. Further, the operating point commanding section 400 also includes an engine start control section that starts the engine E when transitioning from the EV drive mode to the HEV drive mode.

The shift controller 500 drives and controls a solenoid valve in the automatic transmission AT to achieve the target second clutch transmission torque capacity and the target shift stage along a shift schedule shown in a shift map of the automatic transmission AT. Here, the target shift stage is preset in the shift map according to the vehicle speed VSP and the accelerator opening degree APO.

Next, the details of the WSC drive mode will be explained. The WSC drive mode is the state in which the engine E is maintained in the operated state and has a high response to a variation in the requested drive torque. More specifically, with the first clutch CL1 fully engaged, the slip control of the second clutch CL2 is executed as the transmission torque capacity TCL2 is varied according to the requested drive torque, and the vehicle travels using the drive torque applied by the engine E and/or the motor-generator MG.

Since an element, such as a torque converter, which can absorb a difference in revolution speeds, is absent from the hybrid vehicle in the first embodiment, the vehicle speed is determined in accordance with the engine revolution speed of the engine E if the first clutch CL1 and the second clutch CL2 are fully engaged, respectively, and the shift stage of the automatic transmission AT is fixed. In order to maintain the self-rotation of the engine E, a lower limit of the revolution speed according to the idling speed is present. The lower limit of the revolution speed becomes higher when a so-called idle-up operation is carried out during warm-up of the engine E. Furthermore, under the condition where the requested drive torque is high, there is a case where the rapid transition to the HEV drive mode cannot be completed.

On the other hand, in the EV drive mode, since the first clutch CL1 is disengaged, there is no lower limit associated with the above engine revolution speed. However, when traveling by the EV drive mode is made difficult due to a limit based on the battery SOC, or when the required drive torque cannot be attained by the motor-generator MG alone, a stable torque produced by the engine E is required to achieve the requested drive torque.

Therefore, at a low vehicle speed area where the vehicle speed is lower than the speed corresponding to the lower limit, where traveling in the EV drive mode is difficult, or where the requested drive torque cannot be attained by the motor-generator MG alone, the engine revolution speed is maintained at a predetermined lower limit revolution speed, the second clutch CL2 is slip-controlled, and the WSC drive mode is selected so that the vehicle travels using the engine torque according to the slip control of the second clutch CL2.

Figure 8A:
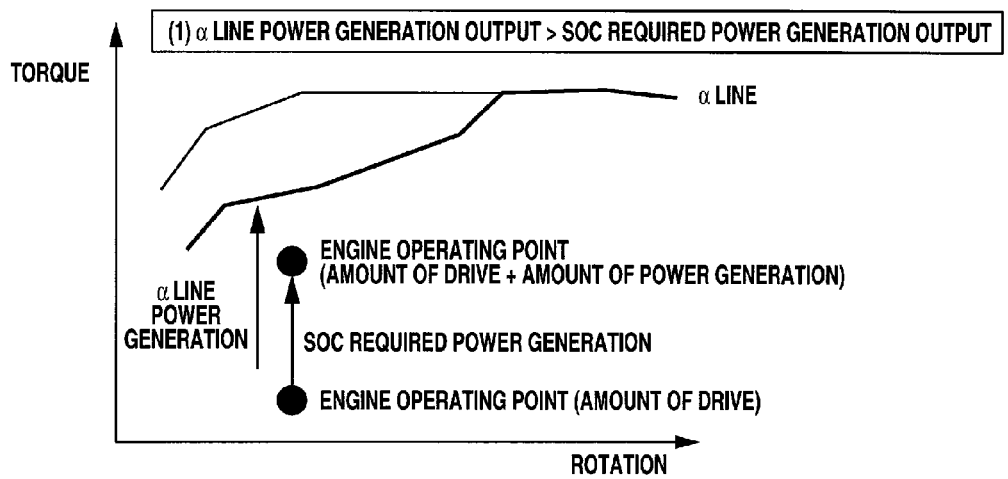
FIGS. 8A to 8C are schematic graphs showing an engine operating point setting process in a WSC drive mode.
Figure 8B:
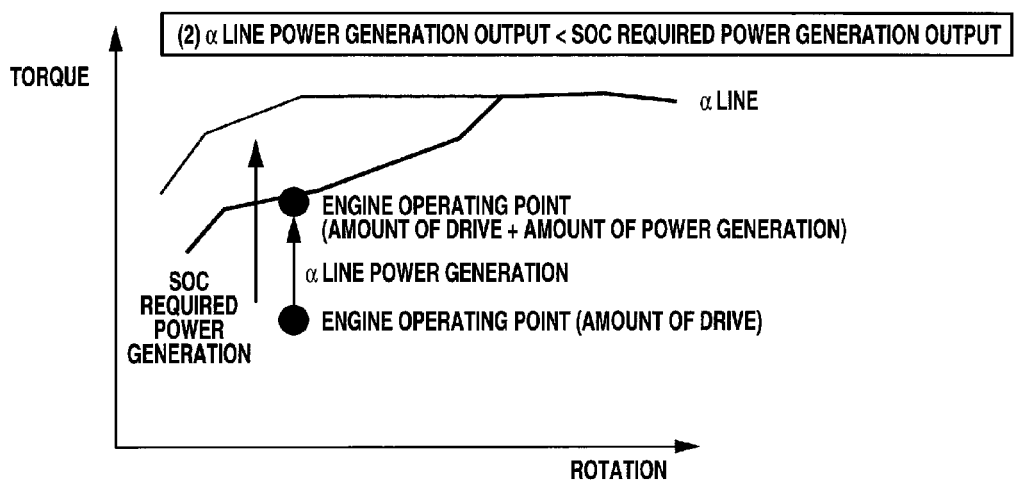
Figure 8C:
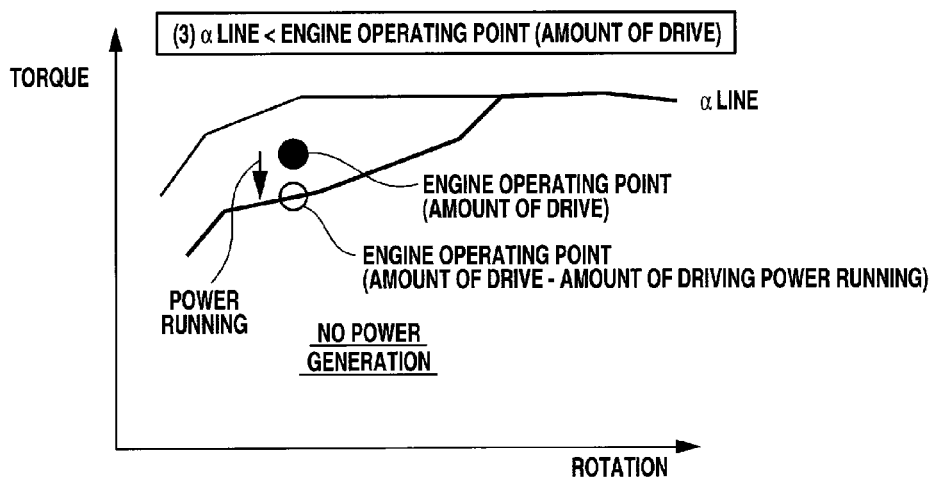
Figure 9:
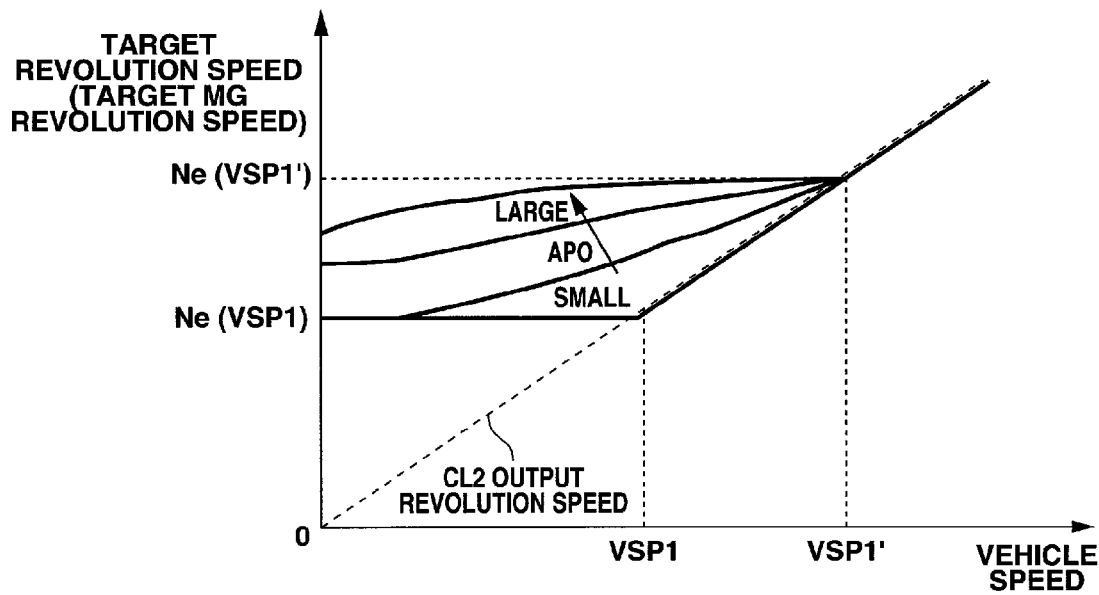
FIG. 9 is a map showing an engine target revolution speed in the WSC drive mode.
Figure 10:
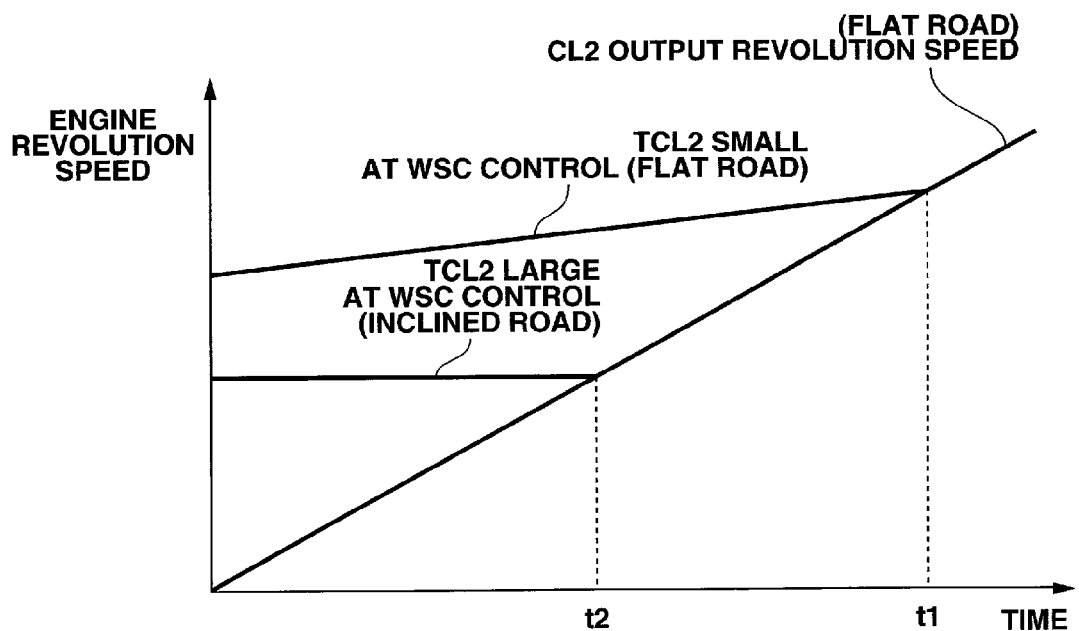
FIG. 10 is a time chart showing a change of the engine revolution speed when increasing a vehicle speed in a predetermined state.

FIGS. 8A, 8B and 8C are schematic graphs showing an engine operating point setting process in the WSC drive mode. FIG. 9 is a map showing the target engine revolution speed in the WSC drive mode.

In the WSC drive mode, when the driver operates the accelerator pedal, a target engine revolution speed characteristic according to an accelerator pedal opening degree APO is selected on the basis of the map in FIG. 9, and the target engine revolution speed according to the vehicle speed is set along this characteristic. By the engine operating point setting process in FIGS. 8A, 8B and 8C, the target engine torque corresponding to the target engine revolution speed is calculated.

Here, the operating point of the engine E is defined as a point that is determined by the engine revolution speed and the engine torque. As illustrated in FIGS. 8A, 8B and 8C, it is preferable that the operation point be executed along a line (hereinafter, an $\alpha$ line) connecting points of high output efficiency of engine E.

However, when the engine revolution speed is set in accordance with the driver's manipulation of the accelerator pedal opening degree (the required drive torque) as described above, the operating point deviates from the $\alpha$ line. Therefore, in order to bring the engine operating point closer to the $\alpha$ line in this case, the engine torque is feed-forward controlled to a value based on the $\alpha$ line.

On the other hand, a revolution speed feedback control is executed with the set engine revolution speed being the target revolution speed. Here, since the engine E and the motor-generator MG are in a directly connected state, by controlling the motor-generator MG to maintain the target revolution speed, the revolution speed of the engine E is also automatically feedback controlled.

At this time, the torque output by the motor-generator MG is automatically controlled to compensate for a deviation of the target engine torque set on the basis of the $\alpha$ line from the required drive torque (a difference between the target engine torque set on the basis of the $\alpha$ line and the required drive torque). The motor-generator MG is provided with a basic or fundamental torque control amount (regeneration and power running) to compensate for the deviation and is further feedback controlled to become equal to the target engine revolution speed.

In a case where the required drive torque is smaller than a drive torque on the $\alpha$ line at a certain engine revolution speed, increasing an engine output torque increases engine output efficiency. At this time, by collecting or recapturing the energy corresponding to the increased output by the motor-generator MG, the torque itself that is input to the second clutch CL2 becomes the required drive torque, while permitting efficient electric power.

Since a torque upper limit is determined by the state of the battery SOC, it is necessary to consider a relationship of the magnitude between a required electric power generation output (SOC required generation power) determined by the battery SOC and a deviation ($\alpha$ line generation power) between the torque of a current operating point from the torque on the $\alpha$ line.

FIG. 8A is the schematic graph of the engine operating point setting process in the WSC drive mode in a case where the α line generation power is greater than or equal to the SOC required generation power. Since the engine output torque cannot be increased to be greater than or equal to the SOC required generation power, the operating point cannot be moved on the α line. However, by moving the operating point to a higher efficiency point, fuel efficiency can be improved.

FIG. 8B is the schematic graph of the engine operating point setting process in the WSC drive mode in a case where the α line generation power is smaller than the SOC required generation power. If the α line generation power is within a range of the SOC required generation power, the engine operating point can be moved on the α line. In this case, it is possible to generate the power while maintaining the operating point of a highest fuel efficiency.

FIG. 8C is the schematic graph of the engine operating point setting process in the WSC drive mode in a case where the engine operating point is higher than the α line. When the operating point according to the required drive torque is higher than the α line, on the condition that there is a margin for the battery SOC, the engine torque is lowered, and the shortage is compensated by the power running of the motor-generator MG. With this operation, it is possible to attain the required drive torque while improving the fuel efficiency.

Next, a change of the WSC drive mode area according to the estimated increase gradient will be explained. FIG. 9 is an engine revolution speed map when the vehicle speed is increased at a predetermined rate.

When the accelerator opening degree APO is greater than or equal to the accelerator opening degree APO1 on a flat road, the WSC drive mode area is executed up to a vehicle speed that is higher than the lower limit vehicle speed VSP1. At this time, as shown in the map of FIG. 9, the target engine revolution speed is gradually increased with increasing vehicle speed. When reaching a speed corresponding to the vehicle speed VSP1', the slip-controlled state of the second clutch CL2 ceases since the second clutch CL2 becomes fully engaged, and the mode transitions to the HEV drive mode.

On an inclined road whose estimated incline gradient is greater than or equal to the predetermined values (g1 or g2), when trying to maintain the same vehicle speed increase state as the above operation, the accelerator opening degree APO becomes large. At this time, the second clutch transmission torque capacity TCL2 becomes large as compared with the flat road. If the WSC drive mode area is extended in this condition as shown in the map of FIG. 9, the second clutch CL2 is maintained in the slip-controlled state with a strong engagement force. Hence, there is a risk that an excessive amount of heat generation of the second clutch CL2 will be produced. Thus, in the MWSC-capable mode map in FIG. 6, which is selected in the case of the inclined road whose estimated gradient is great, the WSC drive mode area is not extended unnecessarily, and is set up to the area corresponding to the lower limit vehicle speed VSP1. With this setting, overheating the second clutch in the WSC drive mode is avoided.

Next, the reason why the MWSC drive mode area is set is explained. In the case where the estimated gradient is greater than or equal to the predetermined gradients (g1 or g2), for instance, when trying to maintain the vehicle in the stop state or a slightly starting state (slight vehicle speed traveling state) without using the brake pedal operation, a large drive torque is required as compared with the flat road. This is because there is a need to maintain the vehicle against the weight load of the gross vehicle weight.

From the viewpoint of avoiding the heat generation caused by the slip of the second clutch CL2, when there is margin for the battery SOC, the EV drive mode may be selected. In this case, when the mode transitions from the EV drive mode to the WSC drive mode, the engine start is needed. Since the motor-generator MG outputs the drive torque while securing the torque for the engine start, a drive torque upper limit is lessened.

Furthermore, when the torque is output to only the motor-generator MG, and the rotation of the motor-generator MG is stopped or is set to an extremely low revolution speed while in the EV drive mode, a lock current flows to a switching element of the inverter 3 (a phenomenon in which the current continues to flow to one element or device), and there is a possibility that durability of the inverter 3 will be deteriorated.

Further, at the area (the area less than that of predetermined vehicle speed VSP2 in FIG. 6) that is lower than the lower limit vehicle speed VSP1, which corresponds to the idle speed of the engine E when the automatic transmission AT is the first speed, the revolution speed of the engine E itself cannot be reduced to be lower than the idle speed. At this time, when selecting the WSC drive mode, there is a risk that the slip amount of the second clutch CL2 is great, which could reduce the durability of the second clutch CL2.

Especially on the inclined road, since the large drive torque is required as compared with the flat road, the second clutch transmission torque capacity TCL2 required becomes high, and the state of the high slip amount with the high torque is maintained. This tends to cause the deterioration of the durability of the second clutch CL2. In addition, since the increase of the vehicle speed is gradual, a greater amount of time to transition to the HEV drive mode is needed, and there is a possibility that the heat will be further generated by the second clutch CL2.

Thus, the MWSC drive mode is selected in which the first clutch CL1 is released while the engine E is operating, and the revolution speed (rpm) of the motor-generator MG is feedback controlled to reach a target revolution speed higher than an output revolution speed of the second clutch CL2 by a predetermined revolution speed. This occurs while the second clutch transmission torque capacity TCL2 is being controlled to the driver's required drive torque.

That is, the second clutch CL2 is slip-controlled while the rotation state of the motor-generator MG is being set to a revolution speed that is lower than the idle speed of the engine E. At the same time, the control of the engine E is switched to the feedback control with the idle speed set as the target revolution speed. In the WSC drive mode, the engine revolution speed is maintained by the revolution speed feedback control of the motor-generator MG. On the other hand, when the first clutch CL1 is released, the engine revolution speed cannot be controlled by the motor-generator MG to be the idle speed. Therefore, an engine revolution speed feedback control is executed by the engine E itself.

With the setting of the MWSC drive mode area, the following advantages can be achieved. First, since the engine E is operating, it is not necessary for the motor-generator MG to secure the torque required to start the engine, and the drive torque upper limit of the motor-generator MG can be large. More specifically, the MWSC drive mode can respond to the higher required drive torque as compared with the EV drive mode. Second, by securing the rotation state of the motor-generator MG, the durability of the switching elements of the inverter 3 can be improved. Third, since the motor-generator MG rotates at the revolution speed that is lower than the idle speed of the engine E, it is possible to reduce the slip amount of the second clutch CL2. Thus, the durability of the second clutch CL2 can be improved.

Figure 11:
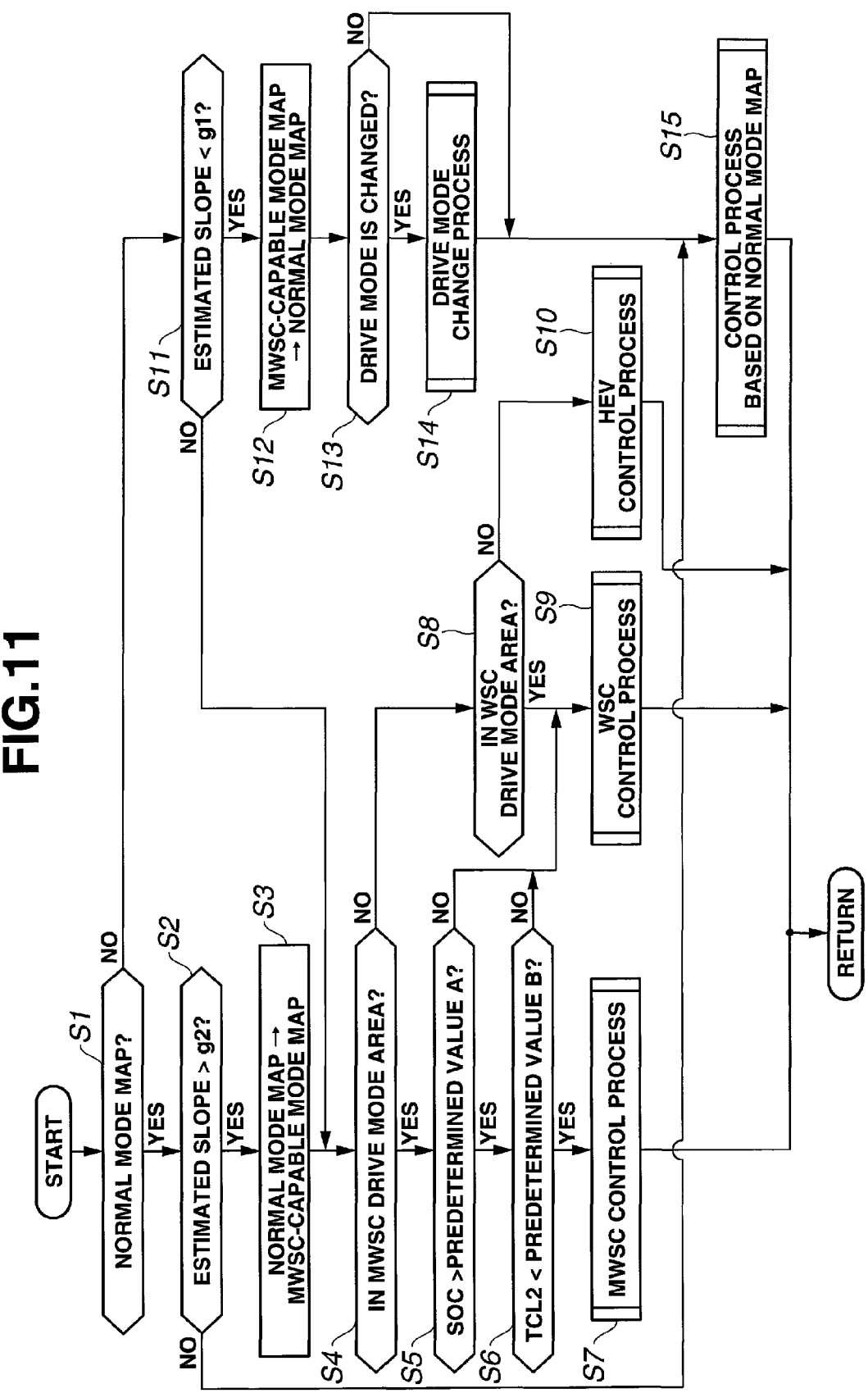
FIG. 11 is a flow chart showing a drive control process at a map change process and a selection of the MWSC-capable mode map.

Next, a map change process and a drive control process when selecting the MWSC-capable mode map are explained with reference to a flow chart in FIG. 11.

At step SI, the integrated controller 10 determines whether the normal mode map is selected. If the normal mode map is selected (YES), the routine proceeds to step S2. If the normal mode map is not selected, but the MWSC-capable mode map is selected (NO), the routine proceeds to step S 11.

At step S2, the integrated controller 10 determines whether the estimated road incline gradient is greater than the predetermined value g2. If the estimated road incline gradient is greater than the predetermined value g2 (YES), the routine proceeds to step S3. If the estimated road incline gradient is less than or equal to the predetermined value g2 (NO), the routine proceeds to step S15, where the control process based on the normal mode map is carried out.

At step S3, the integrated controller 10 switches the mode map from the normal mode map to the MWSC-capable mode map.

At step S4, the integrated controller 10 determines whether the operating point determined by the current accelerator opening degree APO and the vehicle speed VSP is in the MWSC drive mode area. If the operating point is determined to be in the MWSC drive mode area (YES), the routine proceeds to step S5. If the operating point is determined to be outside the MWSC drive mode area (NO), the routine proceeds to step S8.

At step S5, the integrated controller 10 determines whether the battery SOC is greater than a predetermined value A. If the battery SOC is greater than the predetermined value A (YES), the routine proceeds to step S6. If the battery SOC is less than or equal to the predetermined value A (NO), the routine proceeds to step S9. Here, the predetermined value A is a threshold value for judging whether or not the drive torque can be secured by only the motor-generator MG. When the battery SOC is greater than the predetermined value A, this is the state in which the drive torque can be secured by the motor-generator MG alone. When the battery SOC is smaller than or equal to the predetermined value A, the MWSC drive mode will be prevented from being selected since the charge of the battery 4 is needed.

At step S6 the integrated controller 10 determines whether the second clutch transmission torque capacity TCL2 is less than a predetermined value B. If the second clutch transmission torque capacity TCL2 is less than the predetermined value B (YES), the routine proceeds to step S7. If the second clutch transmission torque capacity is greater than or equal to the predetermined value B (NO), the routine proceeds to step S9. Here, the predetermined value B is a predetermined value that indicates that no excess current flows to the motor-generator MG. Since the rotation of the motor-generator MG is controlled, the torque produced at the motor-generator MG becomes greater than or equal to a load that acts on the motor-generator MG.

That is, since the rotation of the motor-generator MG is controlled to bring the second clutch CL2 into the slip state, a larger torque than the second clutch transmission torque capacity TCL2 is produced at the motor-generator MG. Thus, when the second clutch transmission torque capacity TCL2 of the second clutch CL2 is too large, the current flowing to the motor-generator MG becomes too large, and the durability of the switching elements of the inverter 3 deteriorates. In order to avoid this state, when the second clutch transmission torque capacity TCL2 is greater than or equal to the predetermined value B, the selection of the MWSC drive mode is prevented from being selected.

At step S7, an MWSC control process is executed. More specifically, the first clutch CL1 is released while the engine E is in the operated state, and the engine E is feedback controlled so that the revolution speed of the engine E becomes the idle speed, and the motor-generator MG is feedback controlled so that the revolution speed of the motor-generator MG becomes a target revolution speed (but, lower than the idle speed of the engine E) that is set by adding a predetermined revolution speed α to an output side revolution speed Nc12out of the second clutch CL2, and the second clutch CL2 is feedback controlled so that the second clutch transmission torque capacity TCL2 is provided according to the required drive torque. Here, since the MWSC drive mode is not set in the normal mode map, the transition from the EV drive mode or from the WSC drive mode to the MWSC drive mode is included in the MWSC control process at step S7.

At step S8, the integrated controller 10 determines whether the operating point determined by the current accelerator opening degree APO and the vehicle speed VSP is in the WSC drive mode area. If the operating point is determined to be in the WSC drive mode area (YES), the routine proceeds to step S9. If the operating point is determined to be outside of the WSC drive mode area (NO), the operating point is determined to be in the HEV drive mode area, and the routine proceeds to step S10.

At step S9, a WSC control process is executed. Specifically, the first clutch CL1 is fully engaged, and the engine E is feed-forward controlled in accordance with the target drive torque, and the motor-generator MG is feedback controlled so that the revolution speed of the motor-generator MG becomes the idle speed, and the second clutch CL2 is feed-forward controlled so that the second clutch transmission torque capacity TCL2 becomes the required drive torque. Here, since the EV drive mode is not set in the MWSC-capable mode map, the mode transition from the EV drive mode is included in the WSC control process at step S9.

At step S10, the HEV control process is executed. More specifically, the first clutch CL1 is completely engaged, and the engine E and the motor-generator MG are feed-forward controlled so that the engine E and the motor-generator MG produce the torque according to the required drive torque, and the second clutch CL2 is completely engaged. Here, since the EV drive mode is not set in the MWSC-capable mode map, the transition from the EV drive mode is included in the HEV control process at step S10.

At step S11, the integrated controller 10 determines whether the estimated road incline gradient is less than the predetermined value g1. If the estimated road incline gradient is determined to be less than the predetermined value g1 (YES), the routine proceeds to step S12. If the road incline gradient is determined to be greater than or equal to the predetermined value g1 (NO), the routine proceeds to step S4, and the control according to the MWSC-capable mode map is continued.

At step S12, the integrated controller 10 switches the mode map from the MWSC-capable mode map to the normal mode map.

At step S13, the integrated controller 10 determines whether the drive mode is changed as a result of the map change. If the drive mode is determined to be changed (YES), the routine proceeds to step S14. If the drive mode is determined to be the same after the map change (NO), the routine proceeds to step S15. This step is performed because a change from the MWSC drive mode to the WSC drive mode, a change from the WSC drive mode to the EV drive mode, and a change from the HEV drive mode to the EV drive mode could occur when changing the map from the MWSC-capable mode map to the normal mode map.

At step S14, the integrated controller 10 executes a drive mode change process. More specifically, during the mode transition from the MWSC drive mode to the WSC drive mode, the target revolution speed of the motor-generator MG is changed to the idle speed of the engine E, and the first clutch CL1 is engaged when the revolution speeds of the motor-generator MG and the engine E become synchronized. Then, the revolution speed control of engine E is changed from the idle speed feedback control to the target engine torque feed-forward control.

When the mode transition is made from the WSC drive mode to the EV drive mode, the first clutch CL1 is disengaged, the engine E is stopped, the revolution speed control of the motor-generator MG is switched to the torque control based on the required drive torque, and the control of the second clutch CL2 is switched from the feedback control based on the required drive torque to complete engagement.

When the mode transition is made from the HEV drive mode to the EV drive mode, the first clutch CL1 is released, the engine E is stopped, the torque control based on the required drive torque of the motor-generator MG is continued, and the control of the second clutch CL2 is switched from the feedback control based on the required drive torque to becoming completely engaged.

At step S15, the integrated controller 10 executes the control process based on the normal mode map.

Figure 12:
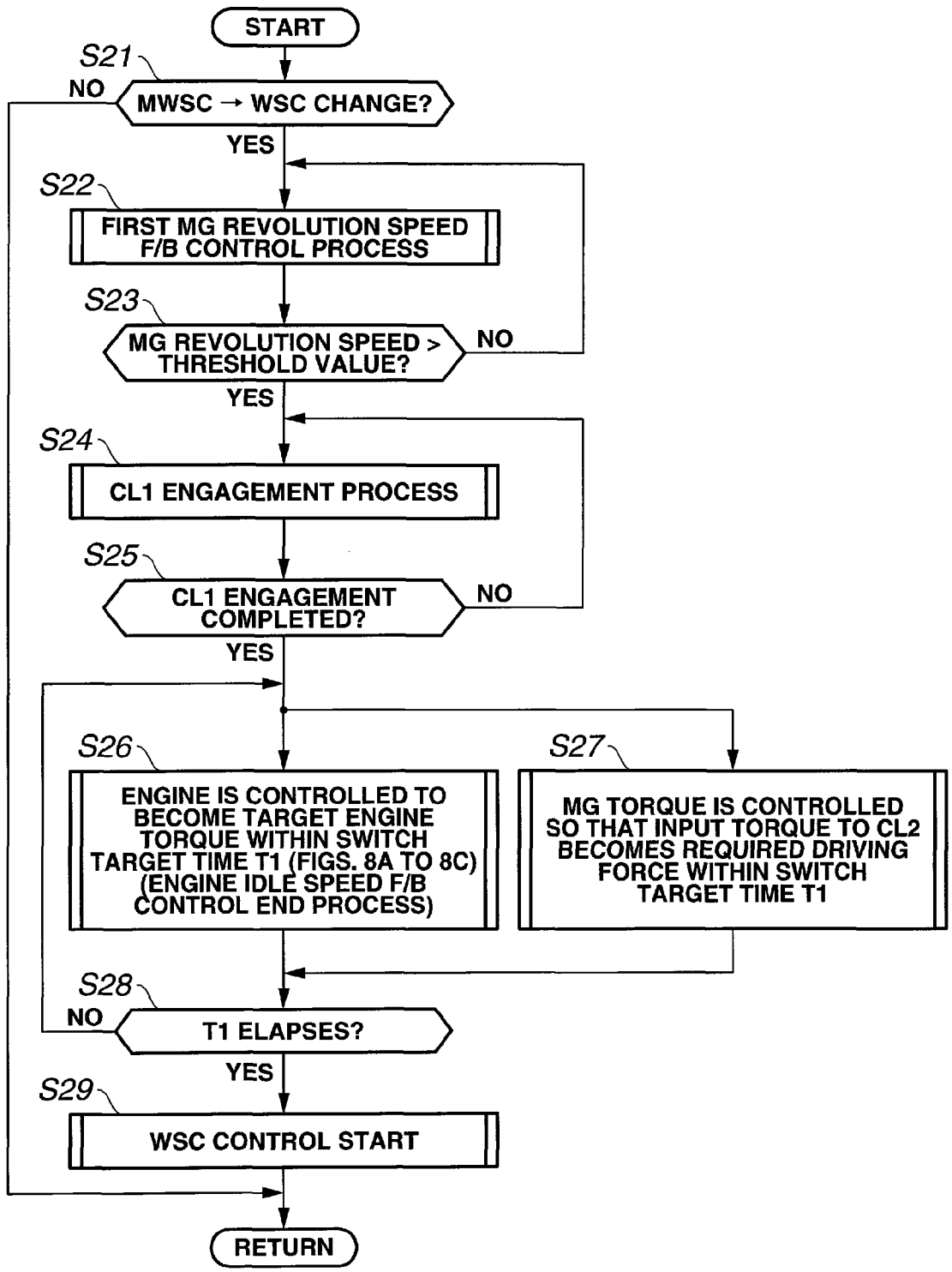
FIG. 12 is a flow chart showing a change control process executed when changing from the MWSC drive mode to the WSC drive mode.

Next, a transition from the MWSC drive mode to the WSC drive mode is explained. FIG. 12 is a flow chart showing the change control process executed when switching from the MWSC drive mode to the WSC drive mode.

At step S21, the integrated controller 10 determines whether the mode transition from the MWSC drive mode to the WSC drive mode is executed. If the mode transition is executed (YES), the routine proceeds to step S22. If the mode transition is not executed (NO), this control flow is terminated. This mode transition from the MWSC drive mode to the WSC drive mode could occur, for instance, when the battery SOC falls below the predetermined value A during travel in the MWSC drive mode, when the second clutch transmission torque capacity TCL2 exceeds the predetermined value B, when the operating point determined by the accelerator opening degree APO and the vehicle speed VSP moves into the WSC drive mode area in the MWSC-capable mode map, or when the mode map is changed from the MWSC-capable mode map to the normal mode map.

At step S22, the integrated controller 10 executes a first motor-generator revolution speed feedback control process. Here, the first motor-generator MG revolution speed feedback control process is a process to control the motor-generator MG revolution speed to synchronize with the idle speed of the engine E.

At step S23, the integrated controller 10 determines whether the motor-generator MG revolution speed exceeds a threshold value. If the motor-generator MG revolution speed exceeds the threshold value (YES), the routine proceeds to step S24. If the motor-generator MG revolution speed does not exceed the threshold value (NO), the routine returns to step S22.

At step S24, the integrated controller 10 executes an engagement process of the first clutch CL1. More specifically, a transmission torque capacity of the first clutch CL1 is gradually increased until the first clutch CL1 becomes completely engaged.

At step S25, the integrated controller 10 determines whether or not the engagement of the first clutch CL1 is completed. If the engagement of the first clutch CL1 is not completed yet (NO), the routine returns to step S24. If the engagement of the first clutch CL1 is completed (YES), the routine advances to steps S26 and S27.

At step S26, the engine E is controlled so that the output torque of the engine E becomes the target engine torque within a switch target time T1. More specifically, as shown in FIGS. 8A, 8B and 8C, the target engine torque at the engine idle speed is calculated. At this time, the engine idle speed feedback control is ended.

At step S27, the torque of the motor-generator MG is controlled so that the input torque to the second clutch CL2 becomes the required drive torque within the switch target time T1. This process and the process of step S26 are carried out at the same time, and a so-called torque changeover control is achieved by steps S26 and S27.

At step S28, the integrated controller 10 determines whether or not the switch target time T1 has elapsed from an initiation of the torque changeover control. If the switch target time T1 has elapsed (YES), the routine proceeds to step S29. If the switch target time T1 has not elapsed (NO), the routine returns to steps S26 and S27.

At step S29, the integrated controller 10 determines whether the mode transition to the WSC drive mode is completed and then executes the WSC control.

Figure 13:
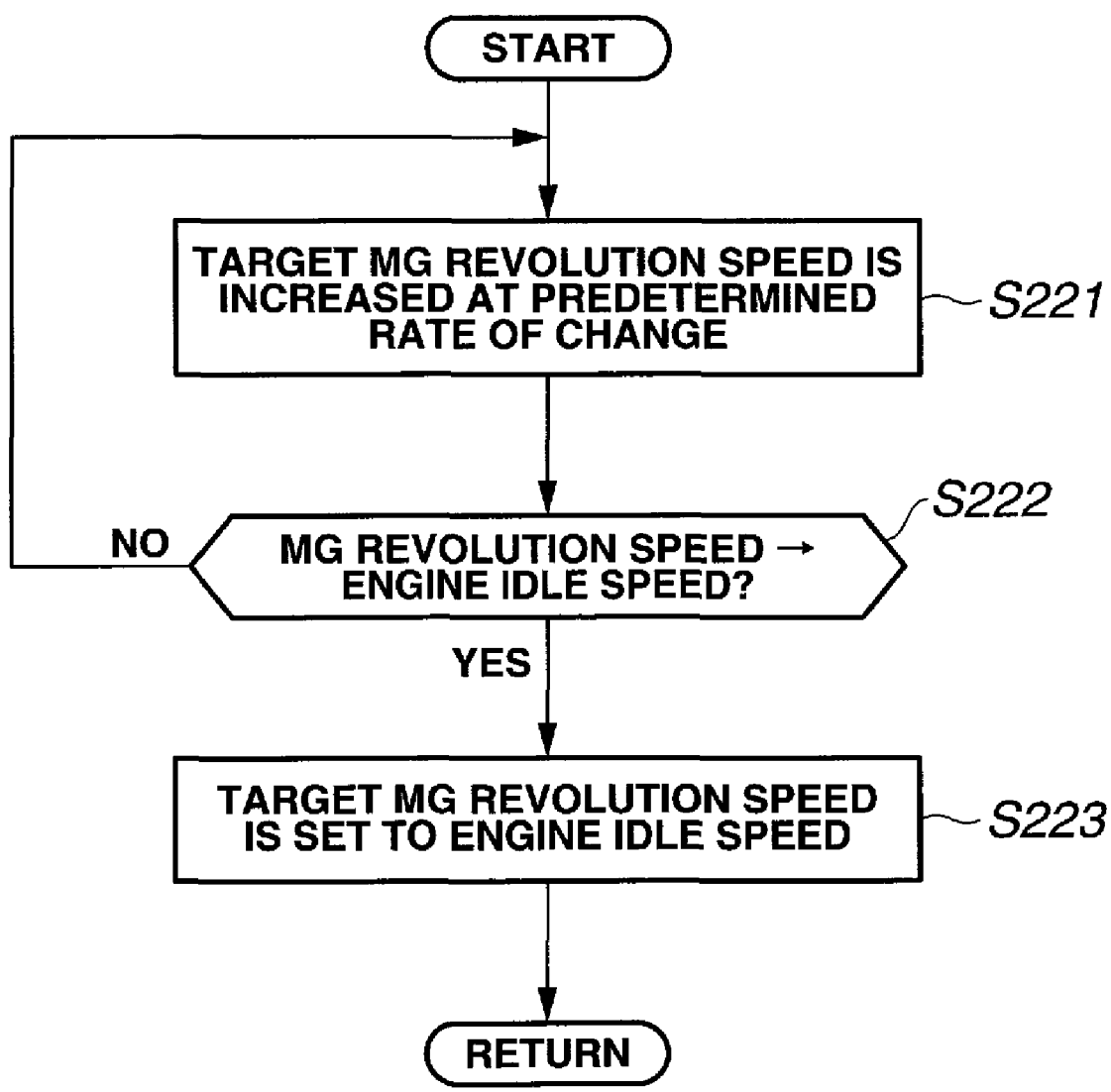
FIG. 13 is a flow chart showing a first motor-generator revolution speed feedback control process.

Next, the first motor-generator revolution speed feedback control process executed at step S22 is explained. FIG. 13 is a flow chart showing the first motor-generator revolution speed feedback control process.

At step S221, the target motor-generator revolution speed is increased at a predetermined rate of change.

At step S222, the integrated controller 10 determines whether the motor-generator revolution speed reaches the engine idle speed. If the motor-generator revolution speed reaches the engine idle speed (YES), the routine proceeds to step S223. If the motor-generator revolution speed has not reached the engine idle speed (NO), the routine returns to step S221, and the increase of the target motor-generator revolution speed at the predetermined rate of change is continued.

At step S223, the target motor-generator revolution speed is set to the engine idle speed, and this motor-generator revolution speed feedback control process is terminated.

Figure 14:
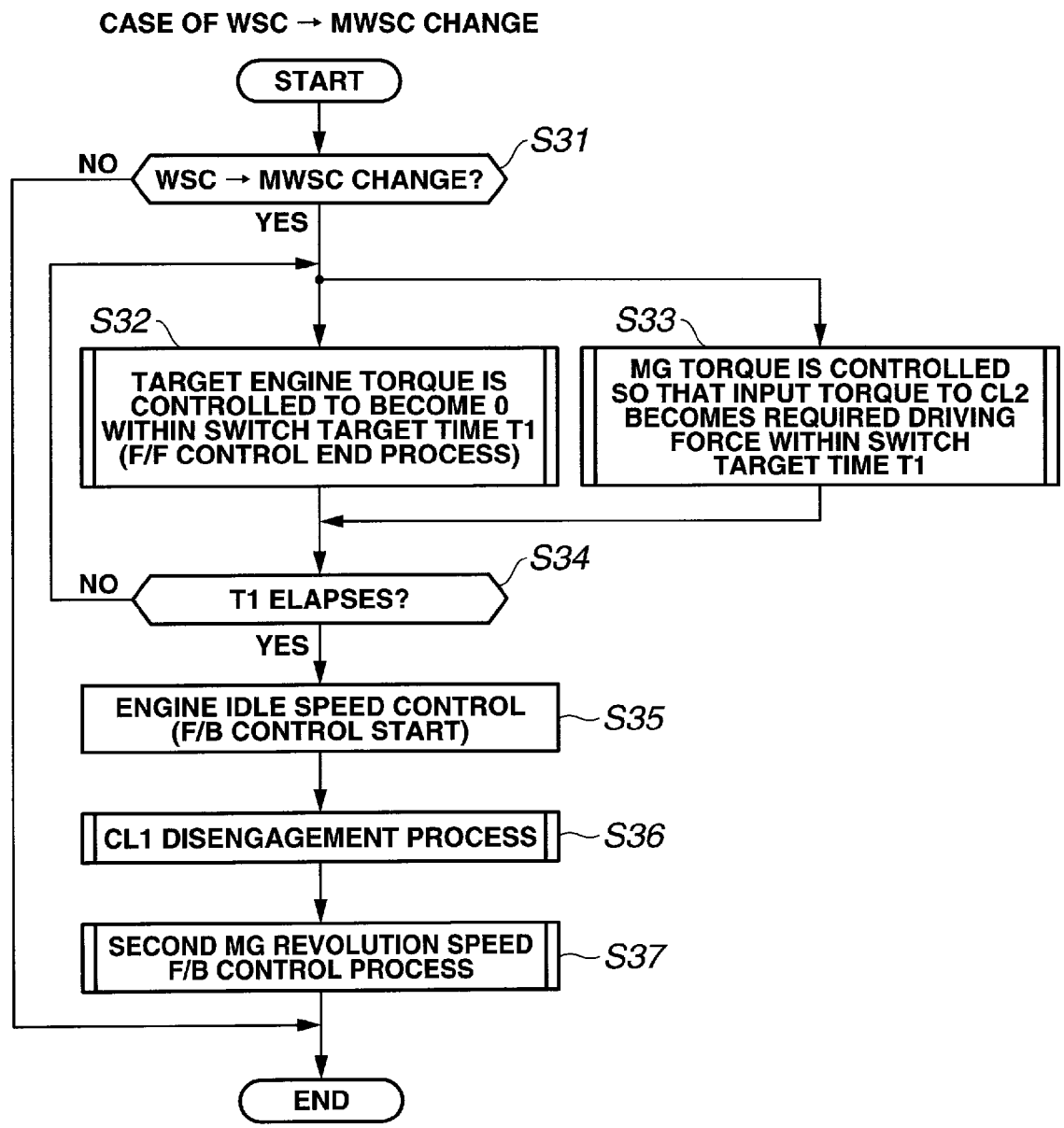
FIG. 14 is a flow chart showing a change control process executed when changing from the WSC drive mode to the MWSC drive mode.

Next, a transition process from the WSC drive mode to the MWSC drive mode is explained. FIG. 14 is a flow chart showing the transition control process executed when switching from the WSC drive mode to the MWSC drive mode.

At step S31 the integrated controller 10 determines whether the mode transition from the WSC drive mode to the MWSC drive mode is executed. If the mode transition is executed (YES), the routine proceeds to step S32. If the mode transition was not executed (NO), this control process is terminated. This mode transition from the WSC drive mode to the MWSC drive mode could occur, for instance, when the mode map is changed from the normal mode map to the MWSC-capable mode map, when the vehicle speed lowers during the travel in the WSC drive mode in the MWSC-capable mode map, or when the accelerator opening degree APO becomes small during the travel in the WSC drive mode in the MWSC-capable mode map.

At step S32, the engine E is controlled so that the output torque of the engine E becomes 0 within the switch target time T1. At this time, the engine torque feed-forward control is ended.

At step S33, the torque of the motor-generator MG is controlled so that the input torque to the second clutch CL2 becomes the required drive torque within the switch target time T1. This process and the process of step S32 are carried out at the same time, and the so-called torque changeover control is achieved by steps S32 and S33.

At step S34, the integrated controller 10 determines whether the switch target time T1 has elapsed from an initiation of the torque changeover control. If the switch target time T1 has elapsed (YES), the routine proceeds to step S35. If the switch target time T1 has not elapsed (NO), the routine returns to steps S32 and S33.

At step S35, the engine E is feedback controlled so that the engine revolution speed becomes the engine idle speed.

At step S36, the integrated controller 10 executes a disengagement process of the first clutch CL1. More specifically, a transmission torque capacity of the first clutch CL1 is gradually decreased until the first clutch CL1 becomes fully disengaged.

At step S37, the integrated controller 10 executes a second motor-generator revolution speed feedback control process. Here, the second motor-generator revolution speed feedback control process controls the motor-generator revolution speed to become the target revolution speed, which is set by either adding the predetermined revolution speed $\alpha$ to the output side revolution speed Nc12out of the second clutch CL2, or by becoming a minimum slip revolution speed $\beta$.

Figure 15:
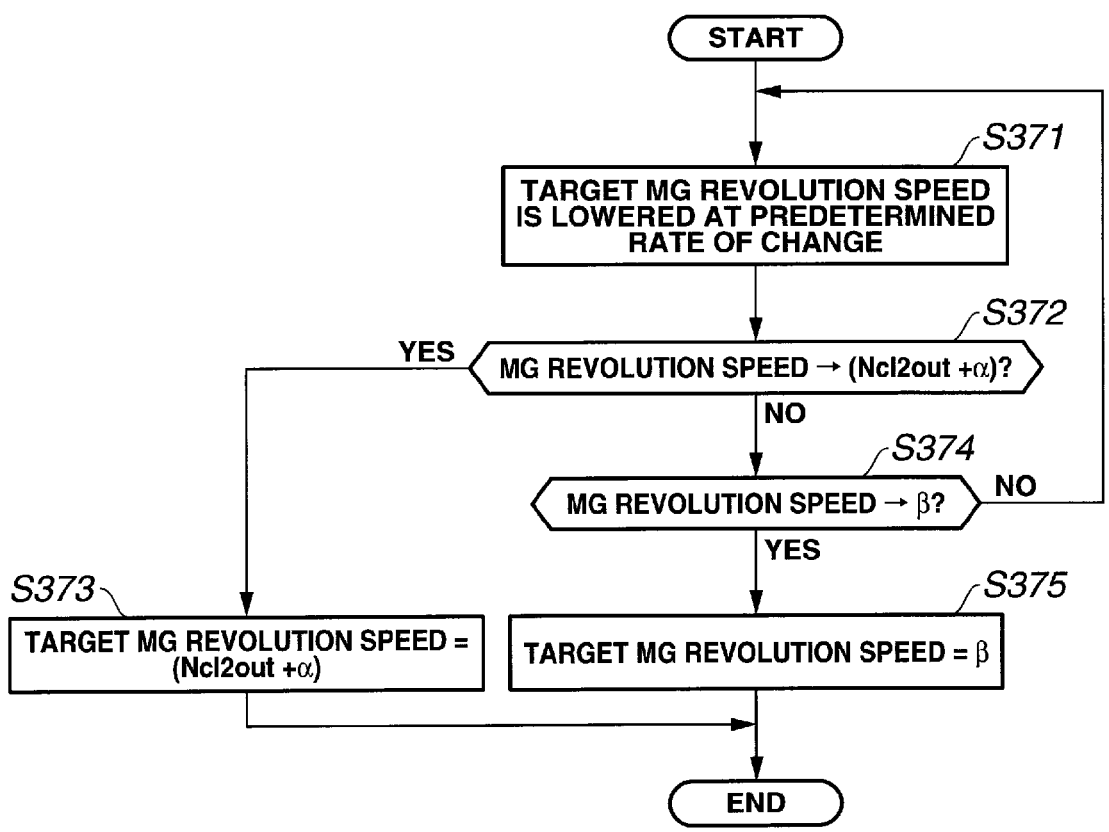
FIG. 15 is a flow chart showing a second motor-generator revolution speed feedback control process.

Next, the second motor-generator revolution speed feedback control process executed at step S37 is explained. FIG. 15 is a flow chart showing the second motor-generator revolution speed feedback control process.

At step S371, the target motor-generator revolution speed is decreased at a predetermined rate of change.

At step S372, the integrated controller 10 determines whether the motor-generator revolution speed reaches the target revolution speed, which is set by adding the predetermined revolution speed $\alpha$ to the output side revolution speed Nc12out of the second clutch CL2. If the motor-generator revolution speed has not reached the target revolution speed (NO), the routine proceeds to step S374. If the motor-generator revolution speed reaches the target revolution speed (YES), the routine proceeds to step S373.

At step S373, the target motor-generator revolution speed is set by adding the predetermined value $\alpha$ to the output side revolution speed Nc12out of the second clutch CL2. Here, the predetermined value $\alpha$ is a value that is smaller than the engine idle speed. Therefore, at the lower vehicle speed area less than the lower limit vehicle speed VSP1, the slip amount of the second clutch CL2 becomes small as compared with the WSC drive mode.

At step S374, the integrated controller 10 determines whether the motor-generator revolution speed reaches the minimum slip revolution speed $\beta$. If the motor-generator revolution speed has not reached the minimum slip revolution speed $\beta$ (NO), the routine proceeds to step S371. If the motor-generator revolution speed reaches the minimum slip revolution speed $\beta$ (YES), the routine proceeds to step S375.

At step S375, the target motor-generator revolution speed is set to the minimum slip revolution speed $\beta$. Here, the minimum slip revolution speed $\beta$ is an optimum minimum revolution speed to protect the switching elements of the inverter 3 that supplies the drive current to the motor-generator MG. Thus, in a state in which the vehicle is near to being stopped, since the motor-generator MG is driven at the minimum slip revolution speed $\beta$, a time during which the current would flow to any of the switching elements of the inverter 3 is suppressed or prevented so the durability of the switching element can be secured.

That is, by executing steps S372 and S374, the highest revolution speed of the two revolution speeds (Nc12out+$\alpha$) and $\beta$, is set as the target motor-generator revolution speed.

Figure 16:
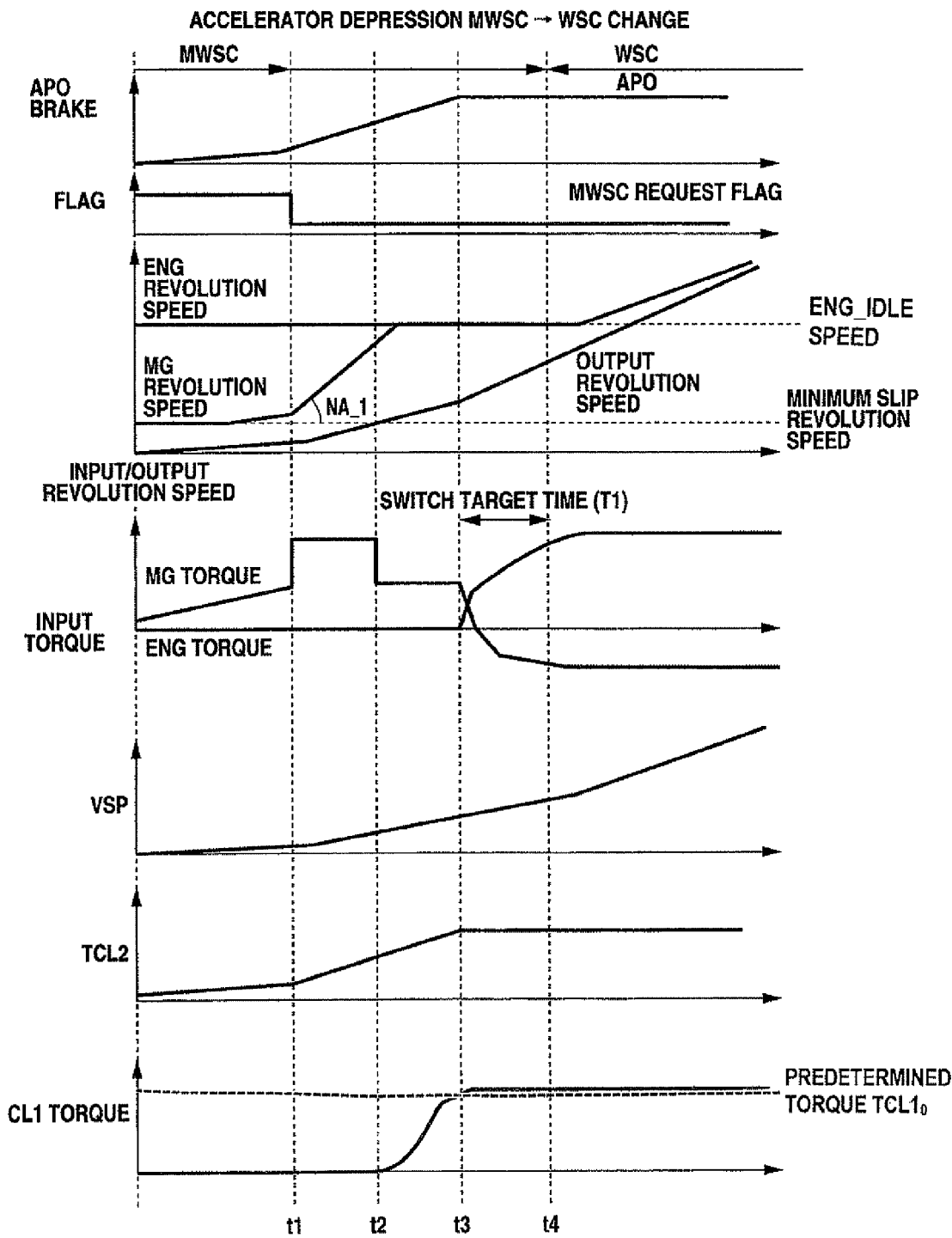
FIG. 16 is a time chart when changing from the MWSC drive mode to the WSC drive mode.

FIG. 16 is a time chart when transitioning from the MWSC drive mode to the WSC drive mode. This time chart indicates a state in which the driver depresses the accelerator pedal and starts the vehicle during travel in the MWSC drive mode under a condition where the estimated road incline gradient is greater than or equal to the predetermined value (the predetermined values g1 or g2) and the MWSC-capable mode map is selected.

At time t1, when the accelerator pedal is depressed and the accelerator opening degree APO becomes large, the area is changed from the MWSC drive mode area to the WSC drive mode area in the MWSC-capable mode map. Then the first motor-generator revolution speed feedback control process is executed.

More specifically, the revolution speed of the motor-generator MG is increased at a predetermined rate of change NA_1, until it becomes synchronized with the engine idle speed. Here, the second clutch transmission torque capacity of TCL2 is also gradually increased as the accelerator opening degree APO becomes large, and the output revolution speed Nc12out of the second clutch CL2 is also increased according to the increase of the second clutch transmission torque capacity of TCL2.

Just after time t2, when the motor-generator revolution speed reaches the engine idle speed, the motor-generator revolution speed is determined to be synchronized with the engine revolution speed, and the engagement control of the first clutch CL1 is started. The two speeds remain synchronized until just after t4.

At time t3, when the transmission torque capacity of the first clutch CL1 exceeds a predetermined torque $TCL1_0$, the changeover control between the engine torque and the motor-generator torque is executed.

More specifically, the engine control is changed from the idle speed feedback control to the target engine torque feed-forward control, and the engine torque is increased. On the other hand, the motor-generator control changes the target revolution speed of the revolution speed control from the values (Nc12out +$\alpha$) or $\beta$ to the target revolution speed according to the vehicle speed based on the map of FIG. 9. At the same time, the motor-generator torque is controlled so that the input torque to the second clutch CL2 becomes the required drive torque.

At time t4, when the switch target time T1 elapses and the changeover control is ended, the transition to the WSC drive mode is complete.

Figure 17:
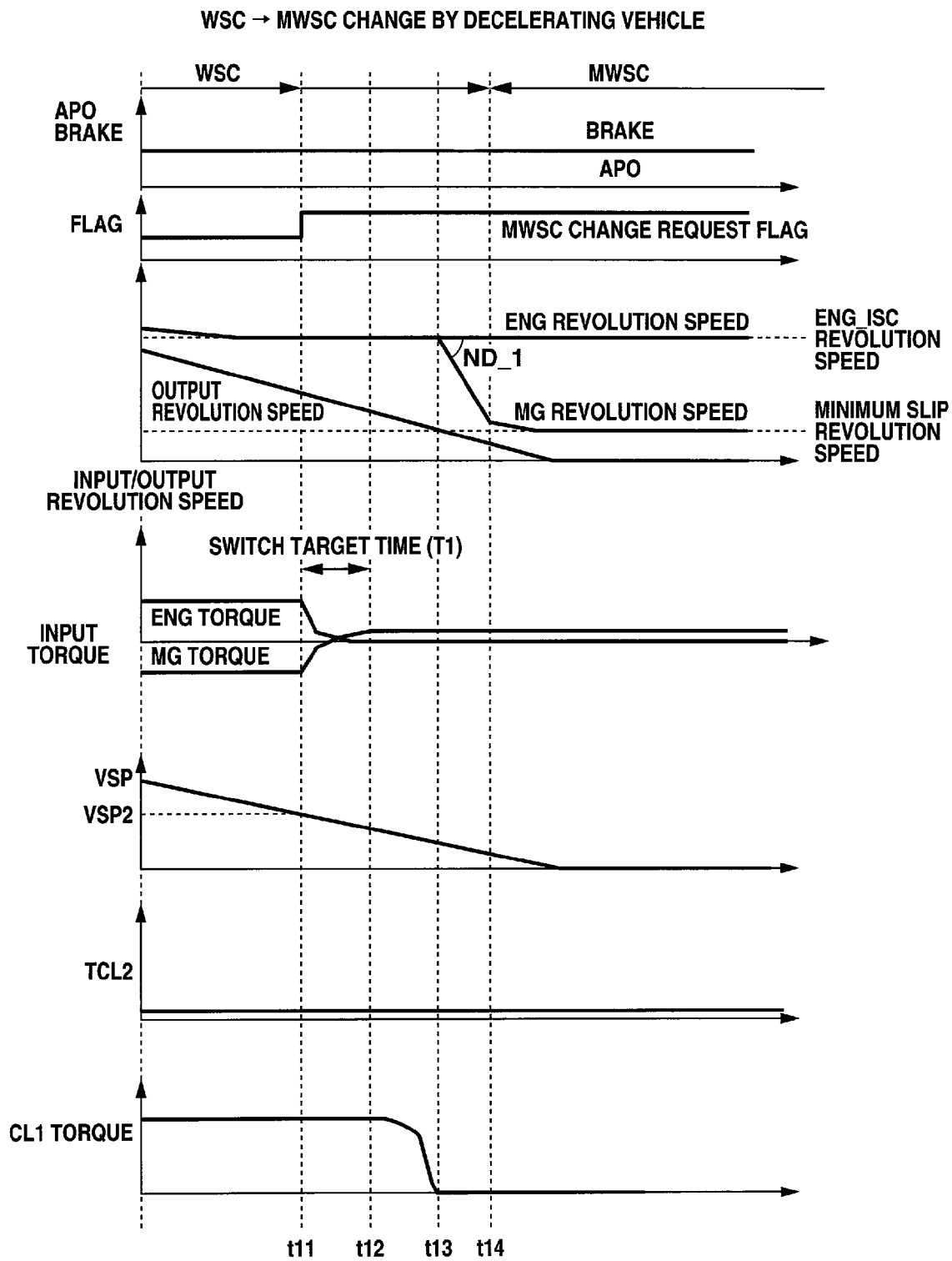
FIG. 17 is a time chart when changing from the WSC drive mode to the MWSC drive mode.

FIG. 17 is a time chart when changing from the WSC drive mode to the MWSC drive mode. This time chart depicts a state in which the driver releases the accelerator pedal and depresses the brake pedal to decelerate the vehicle during the travel by the WSC drive mode under a condition where the estimated road incline gradient is greater than or equal to the predetermined value (the predetermined values g1 or g2) and the MWSC-capable mode map is selected.

At time t11, when the vehicle speed falls below the predetermined vehicle speed VSP2 by the deceleration, the area is changed from the WSC drive mode area to the MWSC drive mode area. Then the changeover control between the engine torque and the motor-generator torque is executed.

More specifically, the engine control changes from the target engine torque feed-forward control to the idle speed feedback control, and the engine torque is decreased to 0. On the other hand, the motor-generator control increases the motor-generator torque so that the input torque to the second clutch CL2 becomes the required drive torque.

At time t12, when the switch target time T1 elapses and the changeover control is ended, the disengagement control of the first clutch CL1 is started.

At time t13, when the disengagement of the first clutch CL1 is completed, the second motor-generator revolution speed feedback control process is executed. More specifically, the revolution speed of the motor-generator MG is lowered at a predetermined rate of change ND_1, and is set to the highest revolution speed of the two revolution speeds (Nc12out+α) and β from the target revolution speed according to the vehicle speed based on the map of FIG. 9. And when the revolution speed of the motor-generator MG reaches any one of the two revolution speeds (Nc12out+α) and β, the change to the MWSC drive mode is completed.

As explained below, in the control apparatus of the hybrid vehicle in the first embodiment, the following effects can be obtained.

(1) The hybrid vehicle includes the engine E, the motor-generator MG that outputs the drive torque of the vehicle and also starts the engine E, the first clutch CL1, the second clutch CL2, the road incline gradient estimation operating section 201 that detects or estimates a change in the vehicle load in response to a road incline, and the MWSC drive mode as a motor slip drive control, which, when the road incline gradient detected by the road incline gradient estimation operating section 201 is greater than or equal to the predetermined value (g1 or g2), controls the first clutch CL1 to disengage while the engine E is operating at the idle speed, and the second clutch CL2 is slip-engaged with the motor-generator revolution speed being lower than the idle speed.

That is to say, when the road incline gradient is greater than or equal to the predetermined value (g1 or g2), the first clutch CL1 is disengaged while the engine E is operating and the second clutch CL2 is slip-engaged with the motor-generator revolution speed being lower than the engine revolution speed.

Therefore, since the engine E is in the operating state, there is no need to secure the motor-generator torque required for starting the engine, and the drive torque upper limit of the motor-generator MG is increased. In addition, since the motor-generator MG is driven at a revolution speed lower than the engine revolution speed, it is possible to reduce the slip amount of the second clutch CL2 so that the heat value of the second clutch CL2 is suppressed.

(2) The vehicle also includes the WSC drive mode as an engine-used slip drive control, in which, when the road incline gradient is less than the predetermined value (g1 or g2), the first clutch CL1 is engaged when the engine E is in the operating state, and the second clutch CL2 is slip-engaged. Therefore, since the first clutch is maintained in the engagement state when the heat generation of the second clutch CL2 is expected to be not significantly large, an awkward feeling due to the engagement and disengagement of the first clutch CL1 can be prevented.

(3) Even in the case where the road incline gradient is greater than or equal to the predetermined value (g1 or g2), when the accelerator opening degree APO that is the driver's required drive torque is greater than or equal to the predetermined accelerator opening degree APO2, the WSC drive mode is selected. Thus, in the case where the driver's required drive torque is not satisfied by the torque of only the motor-generator MG, by using the engine torque, the required drive torque can be satisfied.

(4) Even in the case where the road incline gradient is greater than or equal to the predetermined value (g1 or g2), when the vehicle speed is greater than or equal to the predetermined vehicle speed VSP2, the WSC drive mode is selected. Therefore, the sufficient drive torque can be obtained when increasing the vehicle speed, when at the vehicle start for example.

(5) When transitioning from the MWSC drive mode to the WSC drive mode, the control of the engine E is switched from the idle speed feedback control in which the engine E works at the idle speed to the target engine torque feed-forward control in which the engine E outputs the target engine torque which is the required drive torque. Thus, the torque according to the driver's required drive torque can be output by using the engine E.

(6) When transitioning from the MWSC drive mode to the WSC drive mode, the revolution speed of the motor-generator MG is increased at the predetermined rate of change NA_1, until it becomes synchronized with the engine idle speed. A smooth mode change can therefore be achieved. Further, by setting the predetermined rate of change, no excess torque is required of the motor-generator MG, so that the deterioration of the durability of the switching element of the inverter 3 caused by the excess current can be suppressed or prevented.

(7) When transitioning from the WSC drive mode to the MWSC drive mode, the control of the engine E is switched from the target engine torque feed-forward control in which the engine E outputs the target engine torque to the idle speed feedback control in which the engine E works at the idle speed. Thus, the engine-self-rotation state can be maintained with stability.

(8) When transitioning from the WSC drive mode to the MWSC drive mode, the revolution speed of the motor-generator MG is lowered at the predetermined rate of change ND_1, and is set to be lower than the engine idle speed. A smooth mode change can therefore be achieved. Further, by setting the predetermined rate of change, it is possible to avoid a large drop in torque of the motor-generator MG, and a stable drive state can be achieved.

(9) In the MWSC drive mode, the engine E is feedback controlled so that the revolution speed of the engine E becomes the idle speed that is the minimum revolution speed. Therefore, needless consumption of fuel can be avoided.

(10) The vehicle load detecting section detects or estimates the road incline gradient. Thus, a drive mode according to the road incline gradient can be selected.

(11) When the second clutch transmission torque capacity TCL2 is greater than or equal to the predetermined value B, the travel by the MWSC drive mode is forbidden. Therefore, the deterioration of the durability of the switching element of the inverter 3 caused by the excess current flowing to the motor-generator MG can be suppressed or prevented.

(12) When the battery SOC is smaller than or equal to the predetermined value A, the travel by the MWSC drive mode is forbidden. Even though the engine E is in the operating state in the MWSC drive mode, the vehicle is driven by the motor-generator MG alone. Because of this, when the battery SOC is smaller than or equal to the predetermined value A, a state in which the vehicle cannot travel due to the battery 4 becoming completely discharged can be prevented by forbidding the MWSC drive mode.

(13) The revolution speed of the motor-generator MG is greater than or equal to the predetermined revolution speed β in the MWSC drive mode. Here, the minimum slip revolution speed β is the optimum minimum revolution speed to protect the switching element of the inverter 3 that supplies the drive current to the motor-generator MG. Thus, in the state in which the vehicle is near to becoming stopped, since the motor-generator MG is driven at the minimum slip revolution speed β, the time for which the current flows to the switching element of the inverter 3 is suppressed or prevented. The durability of the switching element can be secured.

Although the invention has been described above on the basis of the first embodiment, the invention is not limited thereto. For instance, in the first embodiment, the road incline gradient is detected or estimated as the vehicle load. However, presence or absence of tow on the vehicle may be detected, or vehicle weight may be detected. When the vehicle load is great, the increase of the vehicle speed is slow and the second clutch CL2 tends to overheat.

Furthermore, in the first embodiment, the case of the FR type hybrid vehicle has been explained. However, FF type hybrid vehicle can be also possible.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control apparatus of a hybrid vehicle comprising:
    an engine;
    a motor configured to output a driving force of the vehicle and perform a start of the engine;
    a first clutch installed between the engine and the motor, the first clutch configured to connect and disconnect the engine and the motor;
    a second clutch installed between the motor and drive wheels, the second clutch configured to connect and disconnect the motor and the drive wheels;
    a vehicle load detector configured to determine a vehicle load; and
    a controller configured to control the first clutch, the second clutch, the engine, and the motor,
    wherein, when the vehicle load determined by the vehicle load detector is greater than or equal to a predetermined load value, the controller is configured to select a motor slip drive mode in which the first clutch is disengaged, the second clutch is slip-engaged, the engine is operating at a predetermined first revolution speed, and the motor is operating at a second revolution speed which is lower than the predetermined first revolution speed.

2. The control apparatus of claim 1, wherein when the vehicle load detected by the vehicle load detector is less than the predetermined load value, the controller is further configured to select an engine-used slip drive mode in which the first clutch is engaged, the second clutch is slip-engaged, and the engine is operating.

3. The control apparatus of claim 2, wherein when a driver's required driving force is greater than or equal to a predetermined force value, the controller is further configured to select the engine-used slip drive mode.

4. The control apparatus of claim 2, wherein when a vehicle speed is greater than or equal to a predetermined speed value, the controller is further configured to select the engine-used slip drive mode.

5. The control apparatus of claim 2, wherein when the controller transitions from selecting the motor slip drive mode to selecting the engine-used slip drive mode, the controller is further configured to control the engine to transition from operating at the predetermined first revolution speed to operating at a third speed corresponding to a target torque, and wherein when transitioning from the engine-used slip drive mode to the motor slip drive mode, the controller is further configured to control the engine to transition from operating at the third revolution speed corresponding to the target torque to operating at the predetermined first revolution speed.

6. The control apparatus of claim 5, wherein when the controller transitions from the motor slip drive mode to the engine-used slip drive mode, the controller is further configured to increase the second revolution speed of the motor at a predetermined rate of change, until the second revolution speed becomes synchronized with the predetermined first revolution speed of the engine; and
    wherein the engine is configured to operate at at least a minimum revolution speed, and when the controller transitions from the engine-used slip drive mode to the motor slip drive mode, the controller is further configured to decrease the second revolution speed of the motor at a predetermined rate of change, until the second revolution speed becomes less than the minimum revolution speed of the engine.

7. The control apparatus of claim 1, wherein the engine is configured to operate at at least a minimum revolution speed, and the controller is further configured to control the engine so that the first predetermined revolution speed becomes the minimum revolution speed while the motor slip drive mode is selected.

8. The control apparatus of claim 1, wherein the vehicle load detector calculates the vehicle load by detecting a road incline gradient.

9. The control apparatus of claim 1, wherein the controller is further configured to prevent selection of the motor slip drive mode when a transmission torque capacity of the second clutch is greater than or equal to a predetermined torque value.

10. The control apparatus of claim 1, further comprising:
    a battery having a charge amount and configured to supply power to the motor, wherein the controller is further configured to prevent selection of the motor slip drive mode when the charge amount of the battery is less than a predetermined charge value.

11. The control apparatus of claim 1, wherein the controller is further configured to control the motor to operate at a revolution speed that is less than the predetermined first revolution speed and greater than or equal to a predetermined minimum slip revolution speed in the motor slip drive mode.

12. A controller for a hybrid vehicle having an engine, a motor, a first clutch installed between the engine and the motor, and a second clutch installed between the motor and drive wheels, the controller comprising:
    means for determining a vehicle load;
    means for controlling the engine;
    means for controlling the motor;
    means for performing a start of the engine; and
    means for selecting a drive mode, wherein a motor slip drive mode is selected in which the first clutch is disengaged, the second clutch is slip-engaged, the means for controlling the engine operates the engine at a predetermined first revolution speed, and the means for controlling the motor operates the motor at a second revolution speed which is lower than the predetermined first revolution speed when the vehicle load is greater than or equal to a predetermined load value; and
    wherein the means for selecting a drive mode selects an engine-used slip drive mode in which the first clutch is engaged, the second clutch is slip-engaged, and the engine is operating when the vehicle load is less than the predetermined load value.

13. A control method for a hybrid vehicle including an engine, a motor configured to perform a start of the engine, a first clutch installed between the engine and the motor, a second clutch installed between the motor and drive wheels and a controller, the method comprising:
determining a vehicle load;
selecting a motor slip drive mode with the controller when the vehicle load is less than a predetermined load value, the motor slip drive mode comprising:
disengaging the first clutch;
slip-engaging the second clutch;
operating the engine at a predetermined first revolution speed; and
operating the motor at a second revolution speed which is lower than the predetermined first revolution speed; and
selecting an engine-used slip drive mode with the controller when the vehicle load is less than the predetermined load value, the engine-used slip drive mode comprising:
engaging the first clutch;
slip-engaging the second clutch; and
operating the engine.

14. The control method of claim 13, further comprising:
selecting the engine-used slip drive mode when at least one of a driver's required driving force is greater than or equal to a predetermined force value and when a vehicle speed is greater than or equal to a predetermined speed value.

15. The control method of claim 13, further comprising:
controlling the engine from operating at the predetermined first revolution speed to operating at a third speed corresponding to a target torque when selecting the engine-used slip drive mode from the motor slip drive mode; and
controlling the engine from operating at the third speed corresponding to the target torque to the predetermined first revolution speed when selecting the motor slip drive mode from the engine-used slip drive mode.

16. The control method of claim 13 wherein the engine is configured to operate at at least a minimum revolution speed, the method further comprising:
increasing the second revolution speed of the motor at a predetermined rate of change until the second revolution speed becomes synchronized with the predetermined first revolution speed of the engine when selecting the engine-used slip drive mode from the motor slip drive mode; and
decreasing the second revolution speed of the motor at a predetermined rate of change until the second revolution speed becomes less than the minimum revolution speed of the engine when selecting the motor slip drive mode from the engine-used slip drive mode.

17. The control method of claim 13 wherein the engine is configured to operate at at least a minimum revolution speed, the method further comprising:
controlling the engine so that the first predetermined revolution speed becomes the minimum revolution speed when in the motor slip drive mode; and
controlling the motor to operate at a revolution speed that is less than the predetermined first revolution speed and greater than or equal to a predetermined minimum slip revolution speed.

18. The control method of claim 13, further comprising:
supplying power to the motor with a battery; and
preventing selection of the motor slip drive mode when a charge amount of the battery is less than a predetermined charge amount.

19. The control method of claim 13 wherein determining a vehicle load comprises calculating the vehicle load by detecting a road incline gradient.

20. The control method of claim 13, further comprising:
preventing the selection of the motor slip drive mode when a transmission torque capacity of the second clutch is greater than or equal to a predetermined torque value.

* * * * *